United States Patent
Uhrenholt et al.

(10) Patent No.: US 11,983,792 B2
(45) Date of Patent: May 14, 2024

(54) FRAGMENT DEPENDENCY MANAGEMENT FOR VARIABLE RATE SHADING

(71) Applicant: Arm Limited, Cambridge (GB)

(72) Inventors: Olof Henrik Uhrenholt, Lund (SE); Toni Viki Brkic, Lund (SE); Edward Hardy, Cambridge (GB)

(73) Assignee: Arm Limited, Cambridge (GB)

( * ) Notice: Subject to any disclaimer, the term of this patent is extended or adjusted under 35 U.S.C. 154(b) by 88 days.

(21) Appl. No.: 17/662,565

(22) Filed: May 9, 2022

(65) Prior Publication Data
US 2022/0366524 A1 Nov. 17, 2022

(30) Foreign Application Priority Data
May 11, 2021 (GB) .................................... 2106685

(51) Int. Cl.
*G06T 1/20* (2006.01)
*G06T 1/60* (2006.01)
*G06T 15/00* (2011.01)

(52) U.S. Cl.
CPC .................. *G06T 1/20* (2013.01); *G06T 1/60* (2013.01); *G06T 15/005* (2013.01)

(58) Field of Classification Search
CPC ........... G06T 1/20; G06T 1/60; G06T 15/005; G06T 11/40; G06T 15/80
See application file for complete search history.

(56) References Cited

U.S. PATENT DOCUMENTS

| | | | |
|---|---|---|---|
| 10,127,626 B1 * | 11/2018 | Ostby | ....................... G06T 1/20 |
| 2003/0142105 A1 * | 7/2003 | Lavelle | .................. G09G 5/363 |
| | | | 345/531 |
| 2004/0041814 A1 | 3/2004 | Wyatt | |
| 2004/0080512 A1 * | 4/2004 | McCormack | .......... G09G 5/363 |
| | | | 711/E12.004 |
| 2007/0165035 A1 * | 7/2007 | Duluk, Jr. | ............... G06T 15/20 |
| | | | 345/506 |
| 2013/0342547 A1 * | 12/2013 | Lum | ....................... G06T 11/40 |
| | | | 345/501 |

(Continued)

FOREIGN PATENT DOCUMENTS

| | | |
|---|---|---|
| EP | 3629300 A1 | 4/2020 |
| EP | 3754612 A1 | 12/2020 |
| GB | 2540227 A | 1/2017 |

OTHER PUBLICATIONS

Combined Search and Examination Report dated Mar. 4, 2022, GB Patent Application No. GB2106685.7.

*Primary Examiner* — Michael Le
(74) *Attorney, Agent, or Firm* — Vierra Magen Marcus LLP

(57) ABSTRACT

A graphics processor comprising a rasteriser, a renderer, and a fragment dependency manager, and a method of operating a graphics processor. The fragment dependency manager is operable to maintain plural queues, where each queue corresponds to a respective set of plural sets of one or more sampling points that an array of sampling points is divided into, and wherein each queue entry is indicative of one or more fragments that when processed by the renderer will produce rendered fragment data for one or more of the sampling points of the set of one or more sampling points to which the queue corresponds.

19 Claims, 14 Drawing Sheets

(56) References Cited

U.S. PATENT DOCUMENTS

| | | | |
|---|---|---|---|
| 2013/0342549 A1* | 12/2013 | Lee | G06T 15/005 345/522 |
| 2014/0267256 A1* | 9/2014 | Heggelund | G06T 15/40 345/421 |
| 2018/0307613 A1* | 10/2018 | Koker | G06F 12/023 |
| 2019/0163481 A1 | 5/2019 | Ayzenfeld | |
| 2020/0098159 A1* | 3/2020 | Gierach | G06F 9/546 |
| 2020/0402292 A1* | 12/2020 | Belli | G06T 1/60 |
| 2020/0402297 A1* | 12/2020 | Brigg | G06T 15/405 |

* cited by examiner

FRAGMENT DEPENDENCY MANAGEMENT FOR VARIABLE RATE SHADING

CROSS-REFERENCE TO RELATED APPLICATIONS

This application claims priority pursuant to 35 U.S.C. 119(a) to United Kingdom Patent Application No. 2106685.7, filed May 11, 2021, which application is incorporated herein by reference in its entirety.

BACKGROUND

The technology described herein relates to the processing of computer graphics, and in particular to a method of operating a graphics processor.

Graphics processing is normally carried out by first splitting a scene (e.g. a 3D model) to be displayed into a number of similar basic components or "primitives", which primitives are then subjected to the desired graphics processing operations. The graphics "primitives" are usually in the form of simple polygons, such as triangles.

Once primitives and their vertices have been generated and defined, they can be further processed by a fragment processing pipeline, in order to generate the desired graphics processing output (render output), such as a frame for display.

This usually involves determining which sampling points of an array of sampling points associated with the render output area to be processed are covered by a primitive, and then determining the appearance each sampling point should have (e.g. in terms of its colour, etc.) to represent the primitive at that sampling point. These processes are commonly referred to as rasterising and rendering, respectively.

When rendering a render output, e.g. frame for display, there is typically a trade-off between image quality and processing effort. For example, "supersampling" arrangements attempt to increase image quality by increasing the number of colours that are sampled (rendered), but this typically involves a greater processing effort. Conversely, decreasing the number of colours that are sampled (rendered) will usually reduce processing requirements, but at the expense of reduced image quality.

"Variable Rate Shading" (VRS) (as defined in the DirectX and Vulkan specifications) is a technique that allows this trade-off between image quality and processing effort to be varied across a render output, e.g. frame for display. In particular, Variable Rate Shading (VRS) allows the area of a render output, e.g. frame, that a single colour is sampled (rendered) for, i.e. the "shading rate", to vary within the render output.

Thus, in Variable Rate Shading (VRS), different shading rates can be used to render a render output such that, for example, a single sampled (rendered) colour is used for a single output pixel, whereas elsewhere in the output, a single sampled (rendered) colour is used for each output pixel in a block of plural output pixels, thereby reducing the processing effort for those pixels.

The Applicants believe that there remains scope for improvements to graphics processors and to graphics processing.

BRIEF DESCRIPTION OF THE DRAWINGS

Various embodiments of the technology described herein will now be described by way of example only and with reference to the accompanying drawings, in which.

Like reference numerals are used for like elements throughout the figures, where appropriate.

DETAILED DESCRIPTION

Figure 1:
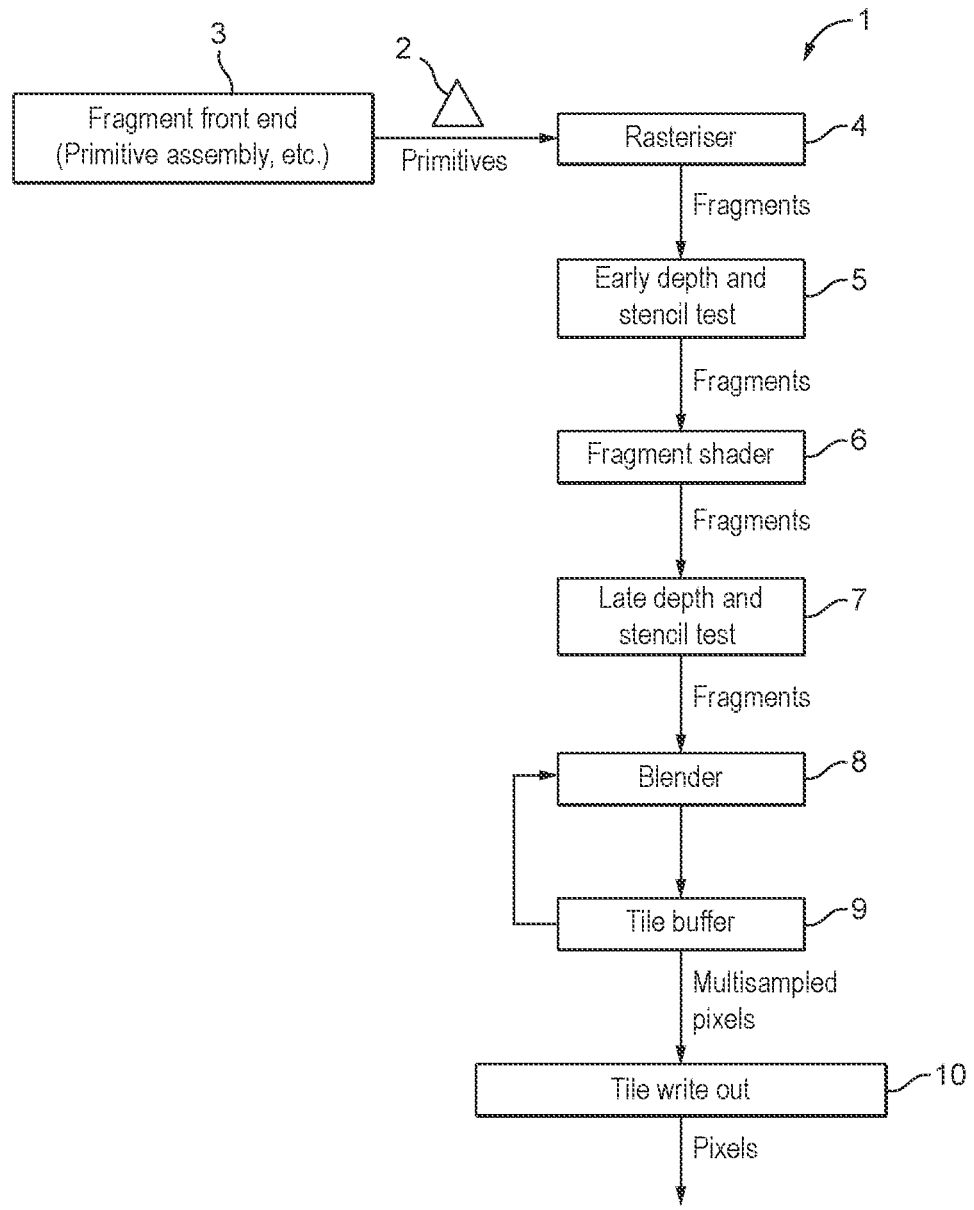
FIG. 1 shows schematically a graphics processing pipeline in accordance with embodiments.

The invention relates to a graphics processor comprising a rasteriser, a renderer, and a fragment dependency manager. The fragment dependency manager is operable to maintain plural queues, where each queue corresponds to a respective set of plural sets of one or more sampling points that an array of sampling points is divided into, and wherein each queue entry is indicative of one or more fragments that when processed by the renderer will produce rendered fragment data for one or more of the sampling points of the set of one or more sampling points to which the queue corresponds. For a graphics fragment or group of graphics fragments that when processed by the renderer will produce rendered fragment data for sampling points of two or more sets of the plural sets of one or more sampling points, the fragment dependency manager adds one or more first entries indicative of that graphics fragment or group of graphics fragments to at least one of the queues that correspond to the two or more sets, and for a subsequent graphics fragment or group of graphics fragments that when processed by the renderer will produce rendered fragment data for one or more sampling points of the two or more sets, the fragment dependency manager prevents at least some processing of the subsequent graphics fragment or group of graphics fragments by the renderer until the one or more first entries have been removed from the at least one queue.

A first embodiment of the technology described herein comprises a method of operating a graphics processor that comprises:
  a rasteriser configured to rasterise input primitives to generate graphics fragments to be processed, each graphics fragment having one or more sampling points of an array of sampling points associated with it;
  a renderer configured to process fragments generated by the rasteriser to generate rendered fragment data; and
  a fragment dependency manager operable to maintain plural queues, wherein each queue corresponds to a respective set of plural sets of one or more sampling points that the array is divided into, and wherein each queue entry is indicative of one or more fragments that when processed by the renderer will produce rendered fragment data for one or more of the sampling points of the set of one or more sampling points to which the queue corresponds;
  the method comprising:
    the rasteriser generating graphics fragments; and
    for each of one or more graphics fragments, the fragment dependency manager adding an entry indicative of the graphics fragment or a group of graphics fragments to at least one queue;
  wherein for a graphics fragment or group of graphics fragments that when processed by the renderer will produce rendered fragment data for sampling points of two or more sets of the plural sets of one or more sampling points, the method comprises:
    the fragment dependency manager adding one or more first entries indicative of that graphics fragment or group of graphics fragments to at least one of the queues that correspond to the two or more sets; and
    the fragment dependency manager, for a subsequent graphics fragment or group of graphics fragments that when processed by the renderer will produce rendered fragment data for one or more sampling points of the two or more sets, preventing at least some processing of the subsequent graphics fragment or group of graphics fragments by the renderer until the one or more first entries have been removed from the at least one queue.

A second embodiment of the technology described herein comprises a graphics processor configured to execute a graphics processing pipeline comprising:
  a rasteriser configured to rasterise input primitives to generate graphics fragments to be processed, each graphics fragment having one or more sampling points of an array of sampling points associated with it;
  a renderer configured to process fragments generated by the rasteriser to generate rendered fragment data; and
  a fragment dependency manager operable to maintain plural queues, wherein each queue corresponds to a respective set of plural sets of one or more sampling points that the array is divided into, and wherein each queue entry is indicative of one or more fragments that when processed by the renderer will produce rendered fragment data for one or more of the sampling points of the set of one or more sampling points to which the queue corresponds;
  wherein the fragment dependency manager is configured to:
    for each of one or more graphics fragments generated by the rasteriser: add an entry indicative of the graphics fragment or a group of graphics fragments to at least one queue;
    for a graphics fragment or group of graphics fragments that when processed by the renderer will produce rendered fragment data for sampling points of two or more sets of the plural sets of one or more sampling points: add one or more first entries indicative of that graphics fragment or group of graphics fragments to at least one of the queues that correspond to the two or more sets; and
    for a subsequent graphics fragment or group of graphics fragments that when processed by the renderer will produce rendered fragment data for one or more sampling points of the two or more sets: prevent at least some processing of the subsequent graphics fragment or group of graphics fragments by the renderer until the one or more first entries have been removed from the at least one queue.

Embodiments are directed to a method of operating a graphics processor, in which a fragment dependency manager is able to maintain a queue in respect of each set of plural sets of one or more sampling points that an array of sampling points is divided into. For example, the sampling points of the array may be organised into plural sets of sampling points, where each set includes the one or more sampling point(s) that correspond to a block of one or more output pixels of an array of output pixels, and the fragment dependency manager may be configured to maintain a queue in respect of each such set of sampling point(s). (Thus, for example (and in particular embodiments), each set may include the sampling points that correspond to a 2×2 block of output pixels, so that where each sampling point corresponds to a single output pixel, the sampling points of the array may be organised into sets of 2×2 sampling points, and the fragment dependency manager may be configured to maintain a queue in respect of each 2×2 set of sampling points.) Each entry in each queue is indicative of one or more fragments (such as a 2×2 group of fragments, i.e. a quad) that when processed by the renderer will produce rendered fragment data for one or more (or all) of the sampling point(s) of the (e.g. 2×2) set to which that queue corresponds.

The fragment dependency manager may be configured to enforce dependencies between different fragments (or different groups of fragments (quads)) that are to be processed for the same set of sampling point(s). That is, the fragment dependency manager may be configured to ensure that fragments that will generate rendered fragment data for one or more sampling points of the same set are processed by the renderer in the correct, desired order.

In embodiments, this is done by the fragment dependency manager adding an entry indicative of each graphics fragment (or of each group of graphics fragments (quad)) of one or more graphics fragments generated by the rasteriser to the queue that corresponds to the set of sampling point(s) for which the graphics fragment (or group of graphics fragments (quad)) will generate rendered fragment data, where the graphics processor is configured such that the renderer will perform (at least some) processing of graphics fragments in accordance with the position(s) of their entry(ies) in the queue(s). An entry may be removed from a queue when a fragment (or quad) has been (completely) processed by the renderer, or when a fragment (or quad) is otherwise culled or "killed" (i.e. when it is determined that the fragment (or quad) need not be processed). As such, (at least some) processing for a fragment (or quad) with an entry at an earlier position in a queue (if not culled before being processed) will be performed by the renderer ahead of (at least some) processing for a fragment (or quad) with an entry at a later position in the queue.

As described above, the graphics processor is configured such that each queue can correspond to a set of one or more sampling points (such as a 2×2 set of sampling points) that the array of sampling points is divided into. This is particularly suitable for the situation (such as in conventional graphics processing) where each graphics fragment will generate rendered fragment data for only one output pixel.

However, with the introduction of Variable Rate Shading (VRS), the number of output pixels for which a fragment will generate rendered fragment data is variable. This means that the number of sets of sampling point(s) for which a fragment (or group of fragments (quad)) will generate rendered fragment data is variable. For example, rendered fragment data will be generated for more sets in respect of a so-called "coarse pixel" than a so-called "fine pixel". The Applicant has now recognised that this can lead to the situation where, for a particular set of one or more sampling points, there can be one or more fragments (or quads) to be processed that cover only sampling point(s) of that set, as well as one or more fragments (or quads) that in addition to covering one or more sampling point(s) of that set also cover one or more sampling point(s) of one or more other sets.

In this regard, the Applicant has recognised that this means that there is a need for a mechanism to enforce dependencies between the different sets of one or more sampling points (i.e. to ensure that fragments are processed by the renderer in the correct, desired order).

While it would be possible to avoid this problem by simply configuring the queues such that each queue corresponds to a coarse pixel (e.g. to the largest coarse pixel supported by the processor) (i.e. by increasing the number of sampling points in each set of sampling points to which each queue corresponds, such that each set includes the (greatest) number of sampling points for which a largest coarse pixel can generate rendered fragment data), the Applicant has found that this approach can degrade the overall performance of the graphics processor, primarily due to the presence of a significant number of "false dependencies". A false dependency arises where e.g. processing of a first fragment by the renderer is postponed until another (earlier) fragment has been processed, even though the first fragment will not actually generate rendered fragment data for the same set of sampling point(s) as the earlier fragment (and so was not actually dependent on the earlier fragment, and so could have been processed sooner).

In embodiments, the fragment dependency manager is configured such that each queue can correspond to a set of one or more sampling points (such as a 2×2 set of sampling points) that the array of sampling points is divided into (as described above), e.g. where each queue corresponds to a block of one or more output pixels (e.g. a block of one or more (e.g. 2×2) "fine pixels").

In addition to this, for a graphics fragment or group of graphics fragments (e.g. quad) that when processed by the renderer will produce rendered fragment data for sampling points from two or more sets of the plural sets (i.e. that correspond to two or more of the queues), the fragment dependency manager will add one or more first entries indicative of that graphics fragment or that group of graphics fragments (that quad) to at least one of the (two or more) queues that correspond to the two or more sets. Then, for a subsequent graphics fragment or group of graphics fragments (quad) that when processed by the renderer will produce rendered fragment data for one or more sampling points of (either or both of) the two or more sets, the fragment dependency manager will prevent at least some processing of that subsequent graphics fragment or that subsequent group of graphics fragments (quad) by the renderer until the one or more first entries have been removed from the at least one queue.

In other words, the fragment dependency manager is able to maintain a queue in respect of each set of one or more sampling points (e.g. in respect of each block of one or more output pixels), but when a fragment (or group of fragments) is to be processed that covers sampling points of two or more of the sets (and so corresponds to two or more queues), an entry is added to one or more of the two or more queues, and any subsequent fragment(s) that cover a sampling point of either of the two or more sets are made to wait (e.g. in respect of at least processing which needs to be performed in a correct order) until that entry(ies) has been removed from the queue(s).

As will be described in more detail below, this means that dependencies between the different sets of one or more sampling point(s) (between different queues) can be properly enforced. Furthermore, this may be done in a way which significantly reduces false dependencies, and so improves the overall performance of the graphics processor.

It will be appreciated, therefore, that various embodiments provide an improved graphics processor.

The graphics processor (i.e. graphics processing unit (GPU)) may be implemented in any suitable manner. The graphics processor may be part of an overall graphics processing system that includes a host processor that executes applications that can require graphics processing by a graphics processing pipeline executed by the graphics processor.

The graphics processor (the graphics processing pipeline) should be (and in embodiments is) configured to generate a render output, i.e. in the form of an array of output pixels. The render output may comprise any suitable render output, such as frame for display, or render to texture output, etc. In embodiments, the render output is an output frame in a sequence of plural output frames that the graphics processor generates. Each output frame may be generated in the manner of various embodiments.

The render output comprises an array of output pixels (i.e. data elements), for each of which appropriate render output data (e.g. a set of colour value data) is generated. The data may comprise, for example, a set of red, green and blue, RGB values and a transparency (alpha, a) value.

The graphics processor should be (and in embodiment is) configured to store the render output (i.e. the array of output pixels) in an external memory. The external memory may be any suitable memory such as a main memory of the graphics processing system. The external memory is external to the graphics processor, i.e. comprises a separate integrated circuit (chip). The render output (array of output pixels) may be stored in a frame buffer provided in the external (main) memory.

The graphics processor may be configured to execute a graphics processing pipeline, where the graphics processing pipeline may comprise any suitable graphics processing pipeline configured to generate a render output (array of output pixels). The graphics processing pipeline may in general comprise a vertex shading pipeline, followed by a fragment shading pipeline.

The vertex shading pipeline may be configured to receive (e.g. from the host processor) attributes of a plurality of vertices (which may be defined for a given graphics processing output, e.g. draw call), and to subject them to vertex shading operations that may operate to transform the attributes for each vertex into a desired form for the fragment shading pipeline. The vertex shading operations performed by the vertex shading pipeline may generate a set of output vertex attributes (i.e. appropriately "shaded" attributes) for use in the fragment shading pipeline.

The fragment shading pipeline may be configured to use the vertex shaded attributes to generate and define a plurality of primitives for processing, and to subject the primitives to processing in order, e.g., to display the frame. To do this, the (fragment shading pipeline of the graphics processing pipeline of the) graphics processor comprises a plurality of processing stages, including at least a rasteriser that rasterises input primitives to generate graphics fragments to be processed, and a renderer that processes fragments generated by the rasteriser to generate rendered fragment data.

The rasteriser is configured to generate graphics fragments to be rendered to generate rendered fragment data for sampling points of the array of sampling points. Each graphics fragment that is generated by the rasteriser may have associated with it a group of one or more sampling points (sample positions) of the array and may be used to generate rendered graphics data for one or more of the sampling points (sample positions) of the group of sampling points (sample positions) associated with the fragment.

The rasteriser may be configured to generate the fragments for rendering in any suitable manner. It may receive e.g. primitives to be rasterised, test those primitives against (groups of) sampling points (sample positions) of the array, and generate fragments representing the primitives accordingly.

The renderer should process fragments generated by the rasteriser to generate rendered fragment data for (covered) sample positions that the fragments represent. The rendering process may derive the data, such as red, green and blue (RGB) colour values and an "Alpha" (transparency) value, necessary to represent the primitive at the sample positions (i.e. "shade" each sample position).

The pipeline may be a tile-based graphics processing pipeline, and so the render output, e.g. frame to be displayed, may be divided into a plurality of smaller sub regions, i.e. tiles. Each tile may be rendered separately (e.g. one after another) (and the rendered tiles may subsequently be recombined to provide the complete render output, e.g., frame for display).

Equally, the tile-based graphics processing pipeline may include a tile buffer that is configured to store rendered fragment data at the end of the pipeline until a given tile is completed and written out to an external memory, such as a frame buffer, for use.

Thus, once generated by the renderer, the rendered fragment data may be stored in the tile buffer. This may involve writing the newly generated fragment data (directly) to the tile buffer. Alternatively, where necessary, newly generated data may be blended with data that has previously been generated for a sampling point in question.

Where blending is used, rendered fragment data (i.e. newly generated rendered fragment data) may be blended with existing (i.e. previously generated) data to generate modified ("blended") rendered fragment data. The modified ("blended") rendered fragment data may then be stored in the tile buffer (e.g. in place of the existing (i.e. previously generated) data). The existing rendered fragment data may be previously stored data e.g. data stored in the tile buffer.

The tile buffer may be configured to store rendered fragment data locally to the graphics processor (on-chip) prior to that data being written out to the external memory, e.g. the frame buffer in the external memory.

The tile buffer may be configured to store rendered fragment data for the array of sample points (sampling positions), with each sample point (position) of the array having a sample value associated with it, and each sample point (position) or group of sample points (each group of sample positions) of the array corresponding to an output pixel of the array of output pixels.

There may be a one to one correspondence between the sample points and the pixels of the output array, but there may not be a one to one correspondence between sample points and output pixels, as downsampling may be carried out on the rendered fragment data to generate the output pixel array. For example, the sample values may be grouped into groups of sample values (such as groups of 2×2 sample values) that are each associated with a respective (e.g. display) pixel in the tile in question.

The sample values may, e.g., comprise colour values (a colour buffer), depth values (a depth buffer), etc.

The graphics processor may include a write out circuit, which may be configured to write the data in the tile buffer (once the data in the tile buffers is complete) out to the external (main) memory (e.g. to the frame buffer). This may include downsampling (averaging), the sample values in the tile buffer to the final output (pixel) value to be written to the main memory (e.g. frame buffer) and/or other output, if desired. For example, where each group of sample points of the array of sample points corresponds to an output pixel of the array of output pixels, the write out circuit may be configured to downsample (average) the sample values of each group of sample points to produce an output value for the output pixel in question.

In accordance with various embodiments, the renderer is operable to generate rendered fragment data using different shading rates. Thus, embodiments relate to variable rate shading (VRS) (as defined in the DirectX and Vulkan specifications).

In Variable Rate Shading (and in embodiments), the area of the render output for which a single colour is rendered (sampled) (by the renderer) can be one of plural different possibilities. For example, when a relatively fine shading rate is used, a single colour may be sampled (by the renderer) for an area of the render output corresponding to only a single output pixel. When a coarser shading rate is used, however, a single colour may be sampled (by the renderer) for an area of the render output corresponding to each pixel in a block of plural output pixels.

Thus, in embodiments, the render output (array of output pixels) is generated by the renderer using one or more of plural possible different shading rates. There may be a set of plural possible shading rates that the graphics processor supports and can use.

Correspondingly, there may be a set of plural possible different sized render output areas for which a single set of colour data value (a single colour) can be sampled (rendered) by the renderer. Accordingly, the method may comprise the renderer rendering a primitive by sampling one or more sets of colour value data (colours) for the primitive, and applying each sampled set of colour value data (colour) to an area of the render output having a size in accordance with the determined shading rate.

The smallest render output area in the set of plural possible render output areas may be referred to as a "fine pixel", and the other, larger render output areas may be referred to as "coarse pixels". Each "fine pixel" may be the same size and location as an output pixel of the output array.

The area of each possible "coarse pixel" may correspond to a block of plural "fine pixels" (and so a block of plural output pixels of the output array).

The different possible shading rates may be referred to in terms of the number of fine pixels that the shading rate corresponds to. For example, a 1×1 shading rate may signify the finest possible shading mode in which a single set of colour value data is sampled for an area of the render output corresponding to a single fine pixel (i.e. a single output pixel of the array of output pixels), whereas a 2×2 shading rate may signify that a single set of colour value data is sampled for an area of the render output corresponding to a block of 2×2 fine pixels.

The set of plural possible shading rates that may be supported by the graphics processing pipeline can include any suitable shading rates. In embodiments, the set of plural possible shading rates supported by the pipeline includes 1×1, 1×2, 2×1, 2×2, 2×4, 4×2 and 4×4 shading rates. Other shading rates would be possible.

In these embodiments, when a primitive is to be rendered, a shading rate may be determined in respect of the primitive. A shading rate can be determined (and specified) based on any suitable property or properties, such as for example, one or more of the drawcall that the primitive belongs to, and/or a vertex that the primitive is associated with, and/or the region of the render output within which the primitive appears, and/or one or more other properties. Thus, a shading rate can be specified "per-drawcall", and/or "per-primitive", and/or "per-screen space", etc.

Once a shading rate has been determined, that shading rate is used when rendering the primitive. This should, and in embodiments does, have the effect that a greater number of colours are sampled by the renderer when a finer shading rate is determined, as compared to when a coarser shading rate is determined. This can be achieved in any suitable manner.

For example, the rasteriser could rasterise primitives into fragments based on the determined shading rate, such that the area of the render output that a fragment generated by the rasteriser corresponds to varies according to determined shading rate. Thus, in an embodiment, the method comprises the rasteriser rasterising the primitive according to the determined shading rate. For example, the rasteriser could generate fragments that correspond to larger areas of the render output when a coarser shading rate is determined, and generate fragments that corresponds to smaller areas of the render output when a finer shading rate is determined. The renderer may then sample a single set of colour value data (a single colour) for each so-generated fragment. This will then have the effect that a greater number of fragments are generated, and so colours are sampled, when a finer shading rate is determined, as compared to when a coarser shading rate is determined.

However, in particular embodiments, the rasteriser is operable to generate fragments in the "normal" manner. That is, in embodiments, the rasteriser operates to generate fragments that each correspond to the same sized area of the render output, e.g. corresponding to one pixel (a "fine pixel"). Fragments generated in this way are then, in effect, "combined" according to the determined shading rate into sets of one or more fragments, and a single set of colour value data (a single colour) is sampled for each such set of one or more fragments. For example, and in an embodiment, a greater number of fragments are included in a set of fragments when a coarser shading rate is determined, as compared to when a finer shading rate is determined. This will then have the effect that a greater number of colours are sampled when a finer shading rate is determined, as compared to when a coarser shading rate is determined.

This "combining" of fragments can be achieved in any suitable manner.

In embodiments, the renderer comprises a programmable processing stage (shader) that is operable to generate render output data by execution threads executing (shader) program instructions. A single set of colour value data may be generated (a single colour may be sampled) by each execution thread executing the (shader) program. In this case, fragments are, in effect, "combined" by issuing (only) one execution thread to the programmable processing stage (shader) for each set of one or more fragments. This then has the effect that the programmable processing stage (shader) executes the (shader) program (only) once for each set of one or more fragments, such that (only) a single set of colour value data is sampled for each set of "combined" fragments.

In embodiments, execution threads are grouped into "groups" or "bundles" of threads, where the threads of one group are run in lockstep, one instruction at a time. This can improve shader program execution efficiency, because it is possible to share instruction fetch and scheduling resources between all the threads in the group. Other terms used for such thread groups include "warps" and "wave fronts". For convenience, the term "thread group" will be used herein, but this is intended to encompass all equivalent terms and arrangements, unless otherwise indicated.

In particular embodiments, execution threads are organised into 2×2 groups of execution thread "quads". Groups of four "quads" are then processed by the renderer as respective thread groups ("warps"), with each thread group ("warp") accordingly including a total of sixteen threads. The sixteen threads in a thread group ("warp") then execute the fragment shader program in lockstep, one instruction at a time. Other groupings of threads would of course be possible.

In these embodiments, the "combining" of fragments occurs when determining thread groups to be executed by the programmable processing stage (shader). Thus, in embodiments, the renderer comprises a thread group generating stage (e.g. a "warp manager") operable to generate thread groups comprising execution threads for execution by the programmable processing stage (shader).

In embodiments, the renderer rendering the primitive using the determined shading rate comprises the thread group generating stage generating a thread group comprising execution threads for execution by the programmable processing stage (shader) based on the determined shading rate (and the programmable processing stage (shader) executing the execution threads in the thread group). Information indicating the shading rate to be used for each thread group may be stored in storage by the thread group generating stage. This information may then be accessed by the programmable processing stage (shader) in order to determine the shading rate to use for each thread group.

Once a colour (set of colour value data) has been sampled by the renderer (executing the (shader) program), the colour should be, and in embodiments is, "broadcast" to each (e.g. covered) sampling point of the array of sampling points that the colour applies to. This should, and in embodiments does, have the effect that a single colour will be used for more sampling points in the array of sampling points when a coarser shading rate is used, as compared to when a finer shading rate is used.

In embodiments, rendered fragment data is "broadcast" to each corresponding sampling point in the tile buffer. This may comprise writing rendered fragment data produced by the renderer (directly) to the tile buffer based on the determined shading rate. Alternatively, where blending is required, a blender stage of the graphics processing pipeline may appropriately blend rendered fragment data newly generated by the renderer with rendered fragment data already stored in the tile buffer based on the determined shading rate.

The (pipeline executed by the) graphics processor comprises a fragment dependency manager. The fragment dependency manager is operable to maintain plural queues, where each queue corresponds to a respective set of plural sets of one or more sampling points that the array is divided into.

The array of sampling points may be divided into the plural sets of one or more sampling points in any suitable manner. The array may be divided (without remainder) into non-overlapping and regularly sized and shaped sets of one or more sampling points. Each set of one or more sampling points may comprise a single sampling point (and so, each queue may correspond to a respective different individual sampling point) or each set may comprise a set of plural sampling points (and so, each queue may correspond to a respective different set of plural sampling points).

In particular embodiments, the sampling points of the array are organised into plural sets of one or more sampling points, where each set includes the one or more sampling point(s) that correspond to a block of one or more output pixels of the array of output pixels (and the fragment dependency manager may be configured to maintain a queue in respect of each such set of sampling point(s)). In this case, each set may comprise the one or more sampling point(s) that correspond to a single output pixel (fine pixel) of the array of output pixels (and so, each queue may correspond to a respective different individual output pixel (fine pixel)), or each set may comprise the sampling points that correspond to a block of plural output pixels (fine pixels) (and so, each queue may correspond to a respective different block of output pixels (fine pixels)).

In this latter case, the blocks of plural output pixels (fine pixels) in question may have any suitable size. In particular embodiments, where (as described above) execution threads are organised into 2×2 groups of execution thread quads, the sampling points of the array may be organised into plural sets of sampling points where each set includes the sampling points that correspond to a 2×2 block of output pixels (fine pixels) of the array of output pixels. Thus, for example (where each sampling point corresponds to a single output pixel), the sampling positions may be organised into 2×2 blocks of sampling position "quads" (and the fragment dependency manager may be configured to maintain a queue in respect of each such set of sampling points).

Other arrangements would be possible.

The fragment dependency manager may be operable to maintain any (plural) number of queues, such as one queue per set of sampling points into which the array of sampling points (e.g. a 32×32 tile of sampling points) is divided. The fragment dependency manager may be operable to maintain one or more sets of plural queues, where each set of plural queues corresponds to a region of the output array of pixels, such as a "patch" e.g. corresponding to a 4×4 pixel area in the array of pixels.

Each of the queues is configured to track (and may be used to enforce) dependencies between different fragments (or different groups of fragments (quads)) that are to be processed for the set of sampling point(s) to which that queue corresponds. That is, each queue is configured to ensure that fragments that will generate rendered fragment data for one or more sampling points of the set to which that queue corresponds are processed by the renderer in the correct, desired order.

To do this, the fragment dependency manager may be configured to add an entry to a queue in respect of each graphics fragment or group of graphics fragments (quad) that is or that are to be processed by the renderer. For each such graphics fragment or group of graphics fragments (quad) that is or that are to be processed by the renderer, the fragment dependency manager may add an entry to the queue that corresponds to the one or more samplings points for which that graphics fragment or group of graphics fragments (quad) will produce rendered fragment data.

Each queue may be configured to keep track of the order in which entries are added to it. Thus, where plural entries are present in a queue (i.e. where there are plural fragments or plural groups of graphics fragments (quads) that are to be processed by the renderer in respect of the set of sampling point(s) in question), the queue may include an oldest entry (being the earliest entry added to the queue), a newest entry (being the most recent entry added to the queue), and optionally one or more intermediate entries.

The graphics processor may be configured such that the renderer will process graphics fragments in accordance with the position(s) of their entry(ies) in the queue(s).

In some embodiments, the graphics processor may be configured such that the renderer will process (only) a graphics fragment (or group, e.g. quad) whose entry is the oldest in a queue. This will mean that a graphics fragment (or group, e.g. quad) that has an earlier entry in a queue will not be processed until any later entry(ies) in that queue have been removed from the queue.

The graphics processor may also or instead be configured such that the renderer can perform some processing for a graphics fragment (or group, e.g. quad) regardless of its position in a queue, but will perform at least some processing (only) for a graphics fragment (or group, e.g. quad) whose entry is the oldest in a queue. For example, the graphics processor may be configured such that the renderer can perform processing (i.e. execute instructions) for a graphics fragment which does not need to be performed in a correct order (relative to other graphics fragments), but can perform processing (execute instructions) which needs to be performed in a correct order (relative to other graphics fragments) (such as e.g. late depth processing and/or blending) (only) for a graphics fragment (or group, e.g. quad) whose entry is the oldest in a queue. This will mean that a graphics fragment (or group, e.g. quad) that has an earlier entry in a queue will not be completely processed (e.g. late depth processing and/or blending will not be performed) until any later entry(ies) in that queue have been removed from the queue.

In embodiments, the fragment dependency manager may be configured to add an entry to a queue in respect of each graphics fragment generated by the renderer, but more typically the fragment dependency manager may add an entry to a queue in respect of some (but not all) graphics fragments generated by the renderer. For example, the fragment dependency manager may only add queue entries in respect of graphics fragments that survive the one or more stages of the graphics processing pipeline between the rasteriser and the renderer, such as for example an early depth and/or stencil test stage.

In particular embodiments, the fragment dependency manager is configured to communicate with or forms part of the thread group generating stage (warp manager), and is configured to add an entry to a queue in respect of each thread group (e.g. each 2×2 thread group quad) generated by the thread group generating stage (as described above).

Similarly, an entry may be removed from a queue when the corresponding fragment (or quad) has been (completely) processed by the renderer, and/or when the corresponding fragment (or quad) is otherwise culled or "killed" (i.e. when it is determined that the fragment (or quad) need not be processed). Thus, at least some processing of a fragment (or quad) with an entry at an earlier position in a queue (if not culled before being processed) will be performed by the renderer ahead of at least some processing of a fragment (or quad) with an entry at a later position in the queue.

Each queue (and each queue entry) can take any suitable form.

Each queue entry is indicative of a fragment or a group of fragments that when processed by the renderer will produce rendered fragment data for one or more of the sampling points of the set of one or more sampling points to which that queue corresponds. Each queue entry may be indicative of a single fragment (to be processed), or a single group of fragments. For example, where (as described above) execution threads are organised into 2×2 groups of execution threads (quads), each queue entry may be indicative of a single 2×2 group of fragments (i.e. a single quad).

In embodiments, the queues comprise (are formed as) a linked list data structure, such as in particular a doubly linked list data structure. The fragment dependency manager may be configured to maintain one linked list in respect of each queue (and so in respect of each set of one or more sampling points).

In these embodiments, each queue entry may include data indicative of the fragment or fragments to which the entry corresponds, together with one or more links (i.e. references or pointers). Each link may point to another entry in the list, such as in particular to a previous entry or a next entry in the list. Where a queue is formed as a doubly linked list, each queue entry may include data indicative of the fragment or fragments to which the entry corresponds, together with a link to the previous entry in the list, and a link to the next entry in the list.

In these embodiments, where an entry is the newest or oldest entry in a list, this may be indicated in any suitable manner. For example, a newest entry in a list (instead of including a link to a next entry in the list) may include a link that points to some other data structure, such as a header of the linked list data structure. Similar, an oldest entry in a list (instead of including a link to a previous entry in the list) may include a link that points to the entry itself or to some other data structure.

In alternative embodiments, the plural queues comprise (are formed as) an array data structure. In these embodiments, the array data structure may comprise one array in respect of each queue (and each queue entry may be an entry in one of the arrays). In particular embodiments, the array data structure is a fixed size array data structure.

The fragment dependency manager can maintain plural queues, where each queue corresponds to a respective set of the plural sets of one or more sampling points that the array is divided into (as described above). The fragment dependency manager can maintain each such queue independently of each other queue. Thus, where (as described above) each queue corresponds to a respective block of one or more output pixels (e.g. a block of one or more (e.g. 2×2) "fine pixels"), each queue may be configured to (independently) track (and may be used to enforce) dependencies between different fragments (or different groups of fragments (quads)) that will produce rendered fragment data only for the block of output pixel(s) in question.

This is particularly suitable for the situation (such as in conventional graphics processing) where each graphics fragment will generate rendered fragment data in respect of only one output pixel (i.e. for only one set of sampling point(s)).

However, as described above, with the introduction of Variable Rate Shading (VRS), the number of output pixels for which a fragment will generate rendered fragment data is variable. This means that the number of sets of sampling point(s) for which a fragment (or group of fragments (quad)) will generate rendered fragment data is variable. For example, rendered fragment data will be generated for more output pixels (and so more sets of sampling points) in respect of a so-called "coarse pixel" than a so-called "fine pixel".

Thus, in embodiments, the graphics fragments (for which entries are added to the queue(s)) can include a graphics fragment that when processed by the renderer will produce rendered fragment data for one or more of the sampling points of a single set of one or more sampling points, i.e. for a single output pixel (fine pixel). The graphics fragments (for which entries are added to the queues) can also include a graphics fragment that when processed by the renderer will produce rendered fragment data for sampling points of two or more of the sets of one or more sampling points, i.e. for a block of output pixels (fine pixels), such as a coarse pixel.

For example, each graphics fragment in respect of a (1×1) fine pixel, when processed by the renderer, will produce rendered fragment data for one or more sampling points of a single set of one or more sampling points. Each graphics fragment in respect of a 1×2 or 2×1 coarse pixel, when processed by the renderer, will produce rendered fragment data for sampling points of two sets of the plural sets of one or more sampling points. Each graphics fragment in respect of a 2×2 coarse pixel, when processed by the renderer, will produce rendered fragment data for sampling points of four sets of the plural sets of one or more sampling points, and so on.

The Applicant has now recognised that this means that, for a particular set of one or more sampling points (and so for a particular queue), there can be one or more fragments (or quad(s)) to be processed that cover only sampling point(s) of that set, as well as one or more fragments (or quad(s)) that in addition to covering one or more sampling point(s) of that set also cover one or more sampling point(s) of one or more other sets.

In this regard, the Applicant has recognised that this means that there is a need for a mechanism to track (and enforce) dependencies between the different sets of one or more sampling points (e.g. between the different queues), i.e. to ensure that fragments are processed by the renderer in the correct, desired order (and in embodiments the fragment dependency manager is configured to do this).

Thus, the fragment dependency manager is configured, for a graphics fragment or group of graphics fragments (e.g. quad) that when processed by the renderer will produce rendered fragment data for sampling points from two or more sets of the plural sets (i.e. that correspond to two or more of the queues), to add one or more first entries indicative of that graphics fragment or that group of graphics fragments (that quad) to at least one of the (two or more) queues that correspond to the two or more sets. Then, for a subsequent graphics fragment or group of graphics fragments (quad) that when processed by the renderer will produce rendered fragment data for one or more sampling points of (either or both of) the two or more sets, the fragment dependency manager will prevent at least some processing of that subsequent graphics fragment or that subsequent group of graphics fragments (quad) by the renderer until the one or more first entries have been removed from the at least one queue.

In other words, the fragment dependency manager is able to maintain a queue in respect of each set of one or more sampling points (e.g. in respect of each block of one or more fine pixels), but when a fragment (or group of fragments) is to be processed that covers sampling points of two or more of the sets (and so corresponds to two or more queues), an entry is added to one or more of the two or more queues, and any subsequent fragment(s) that cover a sampling point of either of the two or more sets are made to wait (e.g. in respect of at least processing which needs to be performed in a correct order) until that entry(ies) has been removed from the queue(s).

In particular, for a graphics fragment or group of graphics fragments that corresponds to a block of one or more coarse pixels, the fragment dependency manager can add one or more first entries indicative of that graphics fragment or group of graphics fragments to at least one of the queues that correspond to the fine pixels covered by the block of one or more coarse pixels.

In this way, the fragment dependency manager may be configured to track (and enforce) dependencies between different fragments (or different groups of fragments (quads)) that are to be processed for different sets of one or more sampling points (i.e. for different queues), i.e. to ensure that fragments are processed by the renderer in the correct, desired order.

The fragment dependency manager may be configured to prevent at least some processing of the subsequent graphics fragment or group of graphics fragments by the renderer until the one or more first entries have been removed from the at least one queue in any suitable manner.

In embodiments, for a graphics fragment or group of graphics fragments that when processed by the renderer will produce rendered fragment data for sampling points of two or more sets of the plural sets of one or more sampling points, the fragment dependency manager may add a (single) first entry to (only) one of the two or more queues that correspond to the two or more sets. One or more or all of the other queue(s) of the two or more queues may be retired, e.g. such that no further entries are added to the retired queue(s).

Thus, for example, for a graphics fragment in respect of a 1×2 or 2×1 coarse pixel (or a group of graphics fragments in respect of a group of 1×2 or 2×1 coarse pixels) (that, when processed by the renderer, will produce rendered fragment data for sampling points of two sets of the plural sets of one or more sampling points), the fragment dependency manager may add a (single) first entry to (only) one of the two queues that correspond to the two sets. The other one of the two queues may be retired, e.g. such that no further entries are added to the retired queues.

For a graphics fragment in respect of a 2×2 or coarse pixel (or a group of graphics fragments in respect of a group of 2×2 coarse pixels) (that, when processed by the renderer, will produce rendered fragment data for sampling points of four sets of the plural sets of one or more sampling points), the fragment dependency manager may add a (single) first entry to (only) one of the four queues that correspond to the four sets. One or more or each of the other three queues may be retired, e.g. such that no further entries are added to the retired queues.

In these embodiments, a queue may be retired in any suitable manner. For example, the fragment dependency manager may be configured such that no further entries are added to a retired queue. Existing entries may, however, be retained in the retired queue, e.g. until they are naturally removed (i.e. when the corresponding fragment (or quad) is processed, and/or when the corresponding fragment (or quad) is culled).

In these embodiments, entries in respect of subsequent graphics fragments (or groups of graphics fragments) (that when processed by the renderer will produce graphics fragment data for one or more sampling points of the two or more sets) may be added to the one (non-retired) queue, i.e. in order following (behind) the first entry. Thus, for a or each subsequent graphics fragment or group of graphics fragments that when processed by the renderer will produce rendered fragment data for one or more sampling points of the two or more sets, an entry may be added to the one (non-retired) queue of the two or more queues that correspond to the two or more sets (after the first entry).

Since entries in respect of subsequent fragments are added to the same (non-retired) queue (after the first entry), at least some processing of the subsequent graphics fragment(s) or group(s) of graphics fragments will be prevented from being performed by the renderer until the first entry has been removed from the (non-retired) queue. This will have the effect of ensuring that the fragments are processed in the correct order.

Thus, for a graphics fragment or group of graphics fragments that when processed by the renderer will produce rendered fragment data for sampling points of two or more sets of the plural sets of one or more sampling points, a (single) first entry indicative of that graphics fragment or group of graphics fragments may be added to (only) one queue (a first queue) of the two or more queues that correspond to the two or more sets; and, for a subsequent graphics fragment or group of graphics fragments that when processed by the renderer will produce rendered fragment data for one or more sampling points of the two or more sets, an entry may be added to that (first) queue (behind the first entry).

In other words, when a fragment (or group of fragments) is to be processed that covers sampling points of two or more of the sets (and so corresponds to two or more queues), the two or more queues are effectively consolidated into a single queue (which consolidated queue may be configured and used as described above).

Thus, for example, for a graphics fragment in respect of a 1×2 or 2×1 coarse pixel, the fragment dependency manager may consolidate the two queues that correspond to the two sets into a single queue. For a graphics fragment in respect of a 2×2 or coarse pixel, the fragment dependency manager may consolidate the four queues that correspond to the four sets into a single queue, and so on.

In these embodiments, the graphics processor may be configured such that the first entry (in the non-retired, consolidated queue) (which entry will be indicative of one or more fragments that when processed by the renderer will produce rendered fragment data for sampling points of the two or more sets to which the non-retired, consolidated queue corresponds) is considered as being oldest (so that the renderer will process it next, e.g. in respect of at least processing which needs to be performed in a correct order) only when that entry is the oldest in its (non-retired, consolidated) queue, and also when the one or more retired queues are all empty of entries. This will ensure that, where there are existing entries in the one or more retired queue(s)

(which entries were added to the plural queues before the first entry of the non-retired, consolidated queue), the fragment(s) corresponding to those existing entry(ies) will be processed before the fragment(s) corresponding to the first entry (e.g. in respect of at least processing which needs to be performed in a correct order).

In these embodiments, when the fragment dependency manager is maintaining a consolidated queue (which will correspond to two or more sets of one or more sampling points), when a fragment (or group of fragments) is to be processed that covers sampling points of the two or more sets (to which the consolidate queue corresponds) as well as one or more sampling point(s) of one or more other sets, then the queues may be further consolidated in a corresponding manner to that described above.

Thus, for a graphics fragment or group of graphics fragments that when processed by the renderer will produce rendered fragment data for sampling points of the two or more sets to which the consolidated queue corresponds as well as one or more sampling points of one or more other sets, the fragment dependency manager may add a (single) second entry indicative of that graphics fragment or group of graphics fragments to (only) one of the queues; and, for a subsequent graphics fragment or group of graphics fragments that when processed by the renderer will produce rendered fragment data for one or more sampling points of the two or more sets and/or the one or more other sets, the fragment dependency manager may prevent at least some processing of the subsequent graphics fragment or group of graphics fragments by the renderer until the second entry has been removed from the queue, e.g. by adding entries in respect of the subsequent graphics fragment or group of graphics fragments to the one queue, and retiring the other queue(s) (in a corresponding manner to that described above).

In various further embodiments, instead of (always) consolidating all of the queues corresponding to a coarse pixel (e.g. always consolidating all four queues corresponding to a 2×2 coarse pixel), queues may be consolidated depending on the coverage of the coarse pixel in question. In these embodiments, each graphics fragment may have associated with it a coverage mask indicating which sampling points of the plural sampling points that the fragment represents, it is actually being used to render (i.e. are actually covered by the primitive in question). Where only a single sampling point is actually covered by the primitive in question, queues need not be (and in embodiments, are not) consolidated. Where a sub-set (some but not all) of the sampling points are actually covered by the primitive in question (e.g. as indicated by the coverage mask), a corresponding sub-set of the queues can be consolidated (instead of consolidating all of the queues). The consolidation may be done in the manner described above. This can further reduce false dependencies.

It will be appreciated that, in these embodiments, the fragment dependency manager is able to maintain plural queues, but when a fragment (or group of fragments) is to be processed that covers sampling points corresponding to two or more of the queues, those two or more queues are effectively consolidated into a single queue. However, in these embodiments, it may not be possible to split a consolidated queue back into multiple queues.

Thus, in these embodiments, the fragment dependency manager may be able to increase the number of sets of sampling points for which dependencies are tracked (e.g. by increasing the number of sets of sampling points to which a queue corresponds), but may not be able to decrease the number of sets of sampling points for which dependencies are tracked (i.e. may not be able to decrease the number of sets of sampling points to which a queue corresponds). Although this represents an improvement to the case described above where each queue simply corresponds to a coarse pixel, a significant number of false dependencies can remain.

Thus, in various further embodiments, the fragment dependency manager is configured such that it can both increase the number of sets of sampling points for which dependencies are tracked (e.g. by increasing the number of sets of sampling points to which a queue corresponds), and decrease the number of sets of sampling points for which dependencies are tracked (e.g. by decreasing the number of sets of sampling points to which a queue corresponds). This can result in fewer false dependencies.

The fragment dependency manager may be configured to change the number of sets of sampling points for which dependencies are tracked (i.e. to change the number of sets of sampling points to which a queue corresponds) in any suitable manner.

In embodiments, the fragment dependency manager is configured to determine when a (new) queue entry is to be added to a queue (e.g. of the plural queues of a particular set of queues) that is indicative of a fragment (or group of fragments) that when processed by the renderer will produce rendered fragment data for a different number of sets of one or more sampling points than the previous fragment (or group of fragments) for which an entry was added to one of the queues (of the particular set of queues). That is, the fragment dependency manager is configured to determine when the number of sets of sampling points for which a fragment (or group of fragments) will produce rendered fragment data changes.

As described above, this will occur when the shading rate changes. Thus, the fragment dependency manager may be configured to determine when a (new) queue entry is to be added to a queue (of a particular set of queues) that is indicative of a fragment (or group of fragments) that has a different shading rate than the previous fragment (or group of fragments) for which an entry was added to one of the queues (of the particular set of queues).

When the fragment dependency manager determines such a change, the fragment dependency manager may generate information indicative of the change, and may associate that information with the (new) queue entry in question e.g. by storing the information in association with the queue entry in question.

The information may take any suitable form, such as for example a counter value. Thus, when the fragment dependency manager determines a change, the fragment dependency manager may change (e.g. increment) a counter, and may associate the (new) counter value with the (new) queue entry.

Thus, in various embodiments, when the fragment dependency manager determines that a (new) queue entry is to be added to a queue (of a particular set of queues) that is indicative of a fragment (or group of fragments) that has a different shading rate than the previous fragment (or group of fragments) for which an entry was added to one of the queues (of the particular set of queues), the fragment dependency manager may change (e.g. increment) a counter. The fragment dependency manager may then associate the (new) counter value with the (new) queue entry, e.g. by storing it in association with the (new) queue entry.

In these embodiments, when a (new) queue entry is to be added to a queue (of a particular set of queues) that is indicative of a fragment (or group of fragments) that has the same shading rate as the previous fragment (or group of fragments) for which an entry was added to one of the queues (of the particular set of queues), the fragment dependency manager may not change (may refrain from changing) the counter. The fragment dependency manager may then associate the (existing) counter value with the (new) queue entry, e.g. by storing it in association with the (new) queue entry.

Thus, in these embodiments, each queue entry may comprise or may have associated with it a counter value, e.g. where the counter value is indicative of (changes in) shading rate. Thus, the plural queues can include one or more queue entries each having a lowest (e.g. nth) counter value (and that are all associated with the same first shading rate), and one or more entries each having a next lowest (e.g. (n+1)th) counter value (and that are all associated with the same second shading rate, where the second shading rate is different to the first shading rate). The plural queues can optionally also include one or more entries each having the next lowest (e.g. (n+2)th) counter value (and that are all associated with the same third shading rate, where the third shading rate is different to the second shading rate, but where the third shading rate can be the same as or different to the first shading rate), and so on.

In these embodiments, the graphics processor may be configured such that the renderer will process graphics fragments (e.g. in respect of at least processing which needs to be performed in a correct order) depending on the counter value of (or associated with) their entry(ies), e.g. in order of their counter values. For example, the graphics processor may be configured such that fragments with entries having a lower counter value are (always) processed before fragments with entries having a higher counter value (or vice versa), e.g. in respect of at least processing which needs to be performed in a correct order. In other words, the graphics processor may be configured such that the renderer will (only) perform at least some processing for a graphics fragment (or group) when (all) entries in respect of graphics fragments having lower (or higher) counter values have been removed from the particular set of plural queues.

This again allows dependencies between the different queues to be properly tracked and enforced. Furthermore, these embodiments can further reduce false dependencies, and so improve the overall performance of the graphics processor.

Various embodiments described above are particularly suitable for the case where (as described above) the plural queues comprise (are formed as) a linked list data structure. Various further embodiments relate particularly (but not exclusively) to the case where the plural queues comprise (are formed as) an array data structure. In these embodiments (as described above), each queue may comprise (may be formed as) a respective array of the array data structure.

In these embodiments, for a graphics fragment in respect of a (1×1) fine pixel (or a group of graphics fragments in respect of a group of (1×1) fine pixels) (that, when processed by the renderer, will produce rendered fragment data for sampling points of a single set of the plural sets of one or more sampling points), the fragment dependency manager may add a single entry to (only) the queue that corresponds to that set.

In embodiments, for a graphics fragment or group of graphics fragments that when processed by the renderer will produce rendered fragment data for sampling points of two or more sets of the plural sets of one or more sampling points, plural first entries indicative of that graphics fragment or that group of graphics fragments are added to plural (each) of the queues that correspond to the two or more sets.

Thus, for example, for a graphics fragment in respect of a 1×2 or 2×1 coarse pixel (or a group of graphics fragments in respect of a group of 1×2 or 2×1 coarse pixels) (that, when processed by the renderer, will produce rendered fragment data for sampling points of two sets of the plural sets of one or more sampling points), the fragment dependency manager may add one first entry to each of the two queues that correspond to the two sets.

For a graphics fragment in respect of a 2×2 or coarse pixel (or a group of graphics fragments in respect of a group of 2×2 coarse pixels) (that, when processed by the renderer, will produce rendered fragment data for sampling points of four sets of the plural sets of one or more sampling points), the fragment dependency manager may add a first entry to each of the four queues that correspond to the four sets.

In these embodiments, the graphics processor may be configured such that the renderer will process graphics fragments in accordance with the position(s) of their entry(ies) in the queue(s) (e.g. as described above). In addition, the graphics processor may be configured such that the renderer will (only) perform at least some processing for a graphics fragment (or group of graphics fragments, e.g. quad) when all the entries in respect of that graphics fragment (or group) are the oldest in their respective queues, e.g. in respect of at least processing which needs to be performed in a correct order.

This will again ensure that at least some processing for subsequent graphics fragments or groups of graphics fragments that when processed by the renderer will produce rendered fragment data for one or more sampling points of the two or more sets, will be prevented from being performed by the renderer until each of the plural first entries have been removed from the queues.

Thus, dependencies between the different queues can again be properly tracked and enforced. Furthermore, these embodiments do not suffer from significant false dependencies, and so improve the overall performance of the graphics processor.

In these embodiments, for a graphics fragment or group of graphics fragments that when processed by the renderer will produce rendered fragment data for sampling points of two or more sets of the plural sets of one or more sampling points, plural first entries indicative of that graphics fragment or that group of graphics fragments may be added to the queues that correspond to the two or more sets, such that one first entry is added to each and every one of the queues that correspond to the two or more sets. (Thus, for example, for a graphics fragment in respect of a 2×2 or coarse pixel, the fragment dependency manager may add four first entries, one to each of the four queues that correspond to the four sets).

Alternatively, where e.g. coverage information is available (as described above), queue entries may be added depending on the coverage of the (coarse) pixel in question. Thus, the fragment dependency manager may add a first entry to each of the two or more queues that correspond to sampling points covered by the graphics fragment or group of graphics fragments.

For example, where only a single sampling point is actually covered by the primitive in question, only a single first entry need be (and in embodiments is) added to the queue that corresponds to the covered sampling point. Where a sub-set (some but not all) of the sampling points are actually covered by the primitive in question (e.g. as indicated by the coverage mask), one entry may be added to each queue corresponding to each covered sampling point. This has the effect of reducing false dependencies further still.

The graphics processor and graphics processing pipeline can include any suitable and desired processing circuits, processing logic, components and elements. The graphics processor and graphics processing pipeline are a tile-based graphics processor and processing pipeline operable to generate tiles of an overall render output, e.g. frame.

The graphics processing pipeline that the graphics processor executes can include any suitable and desired processing stages for generating a (the) render output (e.g. frame). Thus, the graphics processing pipeline can include, and in an embodiment does include, in addition to the above described stages, any one or one or more, and in an embodiment all, of the other processing stages that graphics processing pipelines normally include. Thus, for example, the graphics processing pipeline in an embodiment also includes a vertex shading stage, a primitive setup stage, etc. The pipeline in an embodiment also comprises a tiling stage.

A (and each) processing stage (circuit) of the graphics processing pipeline (processor) can be implemented as desired, e.g. as a fixed function hardware unit (circuit) or as a programmable processing circuit (that is programmed to perform the desired operation).

As will be appreciated by those skilled in the art, the graphics processor of the technology described herein may be part of an overall graphics processing system that includes, e.g., and in an embodiment, a host processor that, e.g., executes applications that require processing by the graphics processor. The host processor will send appropriate commands and data to the graphics processor to control it to perform graphics processing operations and to produce graphics processing output required by applications executing on the host processor. To facilitate this, the host processor should, and in an embodiment does, also execute a driver for the graphics processor and a compiler or compilers for compiling programs to be executed by the (programmable processing stage (shader) of the) graphics processor.

The graphics processor may also comprise, and/or be in communication with, one or more memories and/or memory devices that store the data described herein, and/or the output data generated by the graphics processor, and/or store software (e.g. shader) program) for performing the processes described herein. The graphics processor may also be in communication with a host microprocessor, and/or with a display for displaying images based on the data generated by the graphics processor.

Embodiments can be used for all forms of output that a data processor (and processing pipeline) may be used to generate. For example, in the case of graphics processing, the graphics processing pipeline may generate frames for display, render to texture outputs, etc. The output data values from the processing are in an embodiment exported to external, e.g. main, memory, for storage and use, such as to a frame buffer for a display.

In an embodiment, the various functions of the technology described herein are carried out on a single graphics processing platform that generates and outputs data (such as rendered fragment data that is, e.g., written to the frame buffer), for example for a display device.

Embodiments can be implemented in any suitable system, such as a suitably configured micro-processor based system. In an embodiment, the technology described herein is implemented in a computer and/or micro-processor based system.

Embodiments may be implemented in a portable device, such as a mobile phone or tablet.

The various functions of embodiments can be carried out in any desired and suitable manner. For example, the functions of embodiments can be implemented in hardware or software, as desired. Thus, for example, the various functional elements, stages, and "means" of embodiments may comprise a suitable processor or processors, controller or controllers, functional units, circuit(s)/circuitry, processing logic, microprocessor arrangements, etc., that are operable to perform the various functions, etc., such as appropriately dedicated hardware elements (processing circuit(s)/circuitry) and/or programmable hardware elements (processing circuit(s)/circuitry) that can be programmed to operate in the desired manner.

It should also be noted here that, as will be appreciated by those skilled in the art, the various functions, etc., of embodiments may be duplicated and/or carried out in parallel on a given processor. Equally, the various processing stages may share processing circuit(s)/circuitry, etc., if desired.

It will also be appreciated by those skilled in the art that all of the described embodiments can include, as appropriate, any one or more or all of the optional features described herein.

The methods in accordance with embodiments may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc.

Embodiments also extend to a computer software carrier comprising such software which when used to operate a graphics processor, renderer or other system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of embodiments need be carried out by computer software and thus from a further broad embodiment the technology described herein provides computer software and such software installed on a computer software carrier for carrying out at least one of the steps of the methods set out herein.

Embodiments may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

When a computer graphics image is to be displayed, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, then their associated data values are stored in memory, ready for output for display.

FIG. 1 shows schematically a graphics processing pipeline 1 that may operate in accordance with the present embodiment. The graphics processing pipeline 1 shown in FIG. 1 is a tile based renderer and will thus produce tiles of a render output data array, such as an output frame to be generated.

In tile based rendering, rather than the entire render output, e.g., frame, effectively being processed in one go as in immediate mode rendering, the render output, e.g., frame to be displayed, is divided into a plurality of smaller sub regions, usually referred to as "tiles". Each tile (sub region) is rendered separately (typically one after another), and the rendered tiles (sub regions) are then recombined to provide the complete render output, e.g., frame for display. In such arrangements, the render output is typically divided into regularly sized and shaped sub regions (tiles) (which are usually, e.g., squares or rectangles), but this is not essential.

The render output data array may typically be an output frame intended for display on a display device, such as a screen or printer, but may also, for example, comprise intermediate data intended for use in later rendering passes (also known as a "render to texture" output), etc.

FIG. 1 shows the main elements and pipeline stages of the graphics processing pipeline 1 that are relevant to the operation of the present embodiment. As will be appreciated by those skilled in the art, there may be other elements of the graphics processing pipeline that are not illustrated in FIG. 1. It should also be noted here that FIG. 1 is only schematic, and that, for example, in practice the shown functional units and pipeline stages may share significant hardware circuits, even though they are shown schematically as separate stages in FIG. 1. It will also be appreciated that each of the stages, elements and units, etc., of the graphics processing pipeline as shown in FIG. 1 may be implemented as desired and will accordingly comprise, e.g., appropriate circuit(s)/circuitry and/or processing logic, etc., for performing the necessary operation and functions.

FIG. 1 shows schematically the pipeline stages after the graphics primitives (polygons) 2 for input to the rasterisation process have been generated. Thus, at this point the graphics data (the vertex data) has undergone fragment frontend operations 3, such as transformation and lighting operations (not shown), and a primitive set up stage (not shown) to set up the primitives to be rendered, in response to the commands and vertex data provided to the graphics processor.

As shown in FIG. 1, this part of the graphics processing pipeline 1 includes a number of stages, including a rasterisation stage 4, an early Z (depth) and stencil test stage 5, a renderer in the form of a fragment shading stage 6, a late Z (depth) and stencil test stage 7, a blending stage 8, a tile buffer 9 and a downsampling and writeout (multisample resolve) stage 10.

The rasterisation stage 4 of the graphics processing pipeline 1 operates to rasterise the primitives 2 making up the render output (e.g. the image to be displayed) into individual graphics fragments for processing. To do this, the rasteriser 4 receives graphics primitives 2 for rendering, rasterises the primitives to sampling points and generates graphics fragments having appropriate positions (representing appropriate sampling positions) for rendering the primitives.

The fragments generated by the rasteriser 4 are then sent onwards to the rest of the pipeline for processing.

The early Z/stencil stage 5 performs a Z (depth) test on fragments it receives from the rasteriser 4, to see if any fragments can be discarded (culled) at this stage. To do this, it compares the depth values of (associated with) fragments issuing from the rasteriser 4 with the depth values of fragments that have already been rendered (these depth values are stored in a depth (Z) buffer that is part of the tile buffer 9) to determine whether the new fragments will be occluded by fragments that have already been rendered (or not). At the same time, an early stencil test is carried out.

Fragments that pass the fragment early Z and stencil test stage 5 are then sent to the fragment shading stage 6. The fragment shading stage 6 performs the appropriate fragment processing operations on the fragments that pass the early Z and stencil tests, so as to process the fragments to generate the appropriate rendered fragment data.

This fragment processing may include any suitable and desired fragment shading processes, such as executing fragment shader programs on the fragments, applying textures to the fragments, applying fogging or other operations to the fragments, etc., to generate the appropriate fragment data. In the present embodiment, the fragment shading stage 6 is in the form of a shader pipeline (a programmable fragment shader), but other arrangements, such as the use also or instead of fixed function fragment shading units would be possible, if desired.

There is then a "late" fragment Z and stencil test stage 7, which carries out, inter alia, an end of pipeline depth test on the shaded fragments to determine whether a rendered fragment will actually be seen in the final image. This depth test uses the Z buffer value for the fragment's position stored in the Z-buffer in the tile buffers 9 to determine whether the fragment data for the new fragments should replace the fragment data of the fragments that have already been rendered, by comparing the depth values of (associated with) fragments issuing from the fragment shading stage 6 with the depth values of fragments that have already been rendered (as stored in the depth buffer). This late fragment depth and stencil test stage 7 also carries out any necessary "late" alpha and/or stencil tests on the fragments.

The fragments that pass the late fragment test stage 7 are then subjected to, if required, any necessary blending operations with fragments already stored in the tile buffer 9 in the blender 8. Any other remaining operations necessary on the fragments, such as dither, etc. (not shown) are also carried out at this stage.

Finally, the (blended) output fragment data (values) are written to the tile buffer 9 from where they can, for example, be output to a frame buffer for display. The depth value for an output fragment is also written appropriately to a Z buffer within the tile buffer 9.

The tile buffer 9 will store colour and depth buffers that store an appropriate colour, etc., or Z value, respectively, for each sampling point that the buffers represent (in essence for each sampling point of a tile that is being processed).

These buffers store an array of fragment data that represents part (a tile) of the overall render output (e.g. image to be displayed), with respective sets of sample values in the buffers corresponding to respective pixels of the overall render output (e.g. each 2×2 set of sample values may correspond to an output pixel, where 4× multisampling is being used).

For example, the tile buffer 9 may store its fragment data as 32×32 arrays (i.e. corresponding to a 32×32 array of sample positions in the output to be generated, e.g., in the image to be displayed). Each 32×32 data position array in the tile buffer can accordingly correspond to (and will "natively" support) a 16×16 pixel "tile" of, e.g., the frame to be displayed, at 4× anti-aliasing (i.e. when taking 4 samples per pixel).

The tile buffer 9 is provided as part of RAM that is located on (local to) the graphics processing pipeline 1 (chip).

The data from the tile buffer 9 is input to a downsampling (multisample resolve) write out unit 10, and thence output (written back) to an external memory output buffer, such as a frame buffer of a display device (not shown). The display device could comprise, e.g., a display comprising an array of pixels, such as a computer monitor or a printer.

The downsampling and writeout unit 10 downsamples the fragment data stored in the tile buffer 9 to the appropriate resolution for the output buffer (device) (i.e. such that an array of pixel data corresponding to the pixels of the output device is generated), to generate output values (pixels) for output to the output buffer.

Once a tile of the render output has been processed and its data exported to a main memory (e.g. to a frame buffer in a main memory (not shown)) for storage, the next tile is then processed, and so on, until sufficient tiles have been processed to generate the entire render output (e.g. frame (image) to be displayed). The process is then repeated for the next render output (e.g. frame) and so on.

Other arrangements for the graphics processing pipeline 1 would, of course, be possible.

The graphics processing pipeline as illustrated in FIG. 1 will be executed on and implemented by an appropriate graphics processing unit (GPU) (graphics processor) that includes the necessary functional units, processing circuit(s)/circuitry, etc., operable to execute the graphics processing pipeline stages.

In order to control a graphics processor (graphics processing unit) that is implementing a graphics processing pipeline to perform the desired graphics processing pipeline operations, the graphics processor will typically receive commands and data from a driver, e.g. executing on the host processor, that indicates to the graphics processor the operations that it is to carry out and the data to be used for those operations.

Figure 2:
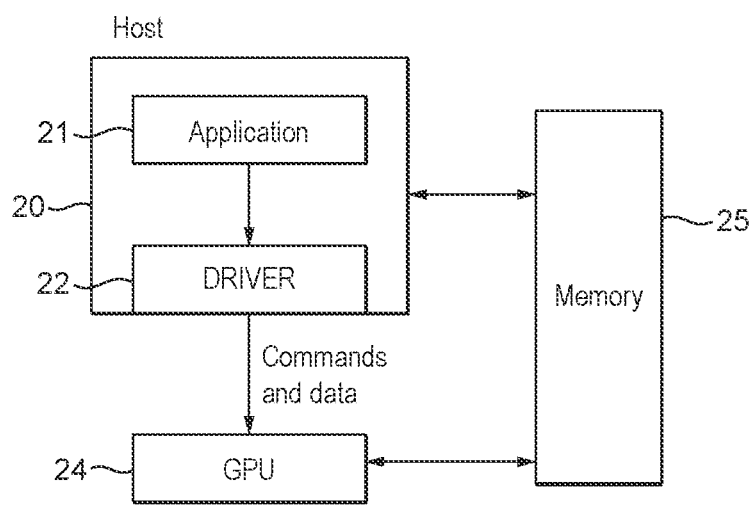
FIG. 2 shows schematically a graphics processing system in accordance with embodiments.

Accordingly, as shown in FIG. 2 (which shows a typical computer graphics processing system), an application 21, such as a game, executing on a host processor 20 that requires graphics processing operations to be performed by an associated graphics processing unit (which executed a graphics processing pipeline 1) 24, will generate appropriate API (Application Programming Interface) calls that are interpreted by a driver 22 for the graphics processor 24 that is running on the host processor 20 to generate appropriate instructions to the graphics processor 24 to generate graphics output required by the application 21.

To facilitate this, a set of instructions will be provided to the graphics processor 24 in response to instructions from the application 21 running on the host system 20 for graphics output (e.g. to generate a frame to be displayed). The driver 22 may send commands and data to the graphics processor 24 by writing to memory 25.

Various embodiments relate in particular to so-called Variable Rate Shading (VRS).

As described above, variable rate shading (VRS) is a technique that allows different shading rates to be used to render a render output, i.e. such that a single colour (set of colour value data) can be sampled (rendered) for one of plural possible different sized areas in a render output. For example, a single colour may be sampled for an area of the render output corresponding to only a single pixel, or a single colour may be sampled for an area of the render output corresponding to each pixel in a block of plural pixels.

Sampling (rendering) a single colour and applying it to plural sampling points (e.g. pixels) will reduce the processing effort required for those sampling points, as compared to sampling an individual colour for each sampling point, but will usually come at the expense of reduced image quality.

In Variable Rate Shading (VRS), there will typically be a set of plural possible shading rates that a graphics processor supports and is able to use. That is, there will typically be a set of plural possible different sized render output areas that a single colour (set of colour value data) can be sampled for. The smallest possible of these render output areas may be referred to as a "fine pixel", and the other, larger render output areas may be referred to as "coarse pixels".

Each "fine pixel" will typically be the same size and location as a pixel of the output display device. However, it is also possible for each "fine pixel" to effectively correspond to less than one pixel of the output display device, for example where downsampling is to be applied.

The area of each possible "coarse pixel" typically corresponds to a block of plural "fine pixels". The different possible shading rates are then referred to in terms of the number of fine pixels that the shading rate corresponds to. For example, a 1×1 shading rate will signify the finest possible shading mode in which a single colour should be sampled for a single fine pixel, whereas a 2×2 shading rate will signify that a single colour should be sampled for an area corresponding to a block of 2×2 fine pixels. A graphics processor may typically support 1×1, 1×2, 2×1, 2×2, 2×4, 4×2 and 4×4 shading rates, for example.

Figure 3:
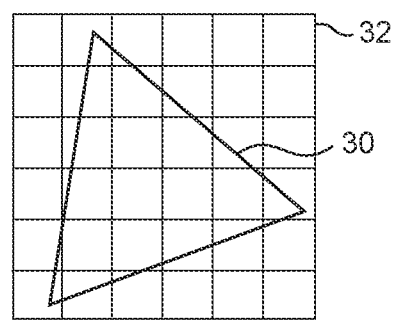
FIG. 3 illustrates a primitive that may be rendered using different shading rates in accordance with various embodiments.

FIG. 3 illustrates a comparison of an exemplary primitive 30 being rendered using 1×1 and 2×2 shading rates. FIG. 3 shows the location of the exemplary primitive 30 to be rendered relative to a 6×6 block of fine pixels 32. Each small square represents one of the fine pixels of the "variable rate shading" (VRS) process.

In the case of a 1×1 shading rate, the rendering process samples (renders) a single colour (set of colour value data) for each fine pixel that a primitive covers. In this case, the primitive 30 is visible in (covers) 23 out of the 36 illustrated fine pixels, and so the rendering process will sample a total of 23 colours (sets of colour value data).

Each larger square in FIG. 3 represents one 2×2 coarse pixel that is used in the 2×2 shading rate process. Each 2×2 coarse pixel encompasses a block of 2×2 fine pixels. In this case, the rendering process samples (renders) a single colour (set of colour value data) for each such coarse pixel that a primitive covers. In this case, the primitive 30 covers 8 out of the 9 illustrated 2×2 coarse pixels, and so the rendering process will sample only 8 colours (sets of colour values).

Thus, it will be appreciated that a coarser shading rate is associated with a lower density of rendered colours as compared to a finer shading rate. Moreover, it will be appreciated that rendering the primitive 30 using a coarser shading rate will reduce processing requirements, as compared to rendering the primitive 30 using a finer shading rate. However, this will typically come at the expense of reduced image quality.

Variable Rate Shading (VRS) allows an application to select a shading rate, which means that groups of pixels (1×1, 1×2, 2×1, 2×2, 2×4, 4×2 or 4×4) are shaded once and the colour value is broadcast to all covered pixels in the "coarse pixel". This saves computational effort at the cost of some visual degradation. It is possible to only support the 1×1, 1×2, 2×1 and 2×2 shading rates. 4×2, 2×4 and 4×4 shading rates may be optional.

Figure 4:
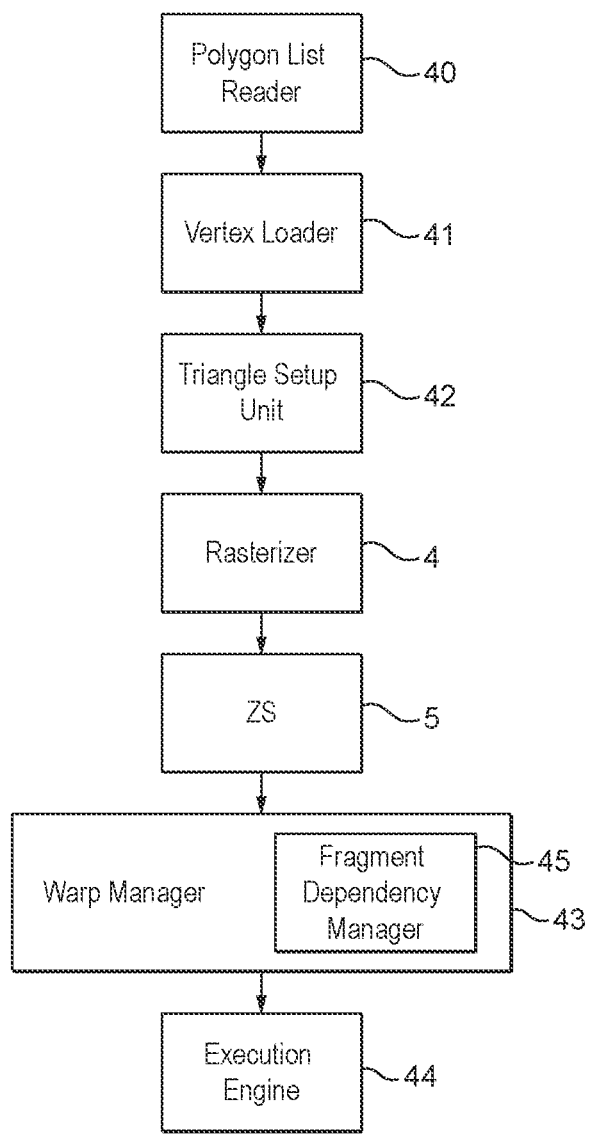
FIG. 4 shows schematically part of a graphics processing pipeline in accordance with embodiments.

FIG. 4 shows in greater detail a part of the graphics processing pipeline 1 that may be executed by the graphics processor 24 in accordance with an embodiment. FIG. 4 shows the stages of the graphics processing pipeline 1 following the generation and storing of primitive lists and processed vertex data. These stages operate to generate each tile of the render output in turn using the primitive lists and processed vertex data stored in memory 25. Tiles generated in this manner are then combined to generate the entire render output.

As shown in FIG. 4, a polygon list reader ("PLR") 40 reads the appropriate primitive list(s) for that tile from the memory 25 to identify the primitives that are to be rendered for the current tile. A vertex loader ("VL") 41 then reads the appropriate processed vertex data for primitives to be rendered from memory 25, and provides the primitives (i.e. their processed vertex data) to a triangle set-up unit ("TSU") 42.

The triangle set-up unit ("TSU") 42 performs primitive setup operations to setup the primitives to be rendered. This includes determining, from the vertices for the primitives, edge information representing the primitive edges. The edge information for the primitives is then passed to the rasteriser 4. When the rasteriser 4 receives a graphics primitive for rendering (i.e. including its edge information), it rasterises the primitive to sampling points and generates one or more graphics fragments having appropriate positions (representing appropriate sampling positions) for rendering the primitive.

In the present embodiment, each graphic fragment that is generated by the rasteriser 4 may represent (have associated with it) one or more (e.g. 4) sampling points. Each graphics fragment may also have associated with it a coverage mask indicating which sampling points of the plural sampling points that the fragment represents, it is actually being used to render (i.e. are actually covered by the primitive in question).

The rasteriser 4 tests individual sampling points to see if the sampling points are covered by the primitive. The rasteriser 4 then generates and outputs individual fragments for rendering corresponding to the sampling points found to be covered by the primitive.

The rasteriser 4 can also associate with each fragment a coverage mask in the form of a bitmap that indicates, for each sample position of the set of sample positions that is associated with the fragment, whether that sample position is covered (i.e., in effect, whether the fragment is being used to render that sampling point (i.e. whether its data should be stored for that sampling point)).

Other rasterisation arrangements would, of course, be possible.

As described above, the Z depth and stencil test stage ("ZS") 5 performs a Z depth test on fragments it receives, to see if any fragments can be discarded (culled) at this stage. Fragments that pass the Z depth and stencil test stage ("ZS") 5 are then sent onwards to the rest of the pipeline for processing.

At this stage, fragments may also be subject to further culling operations, such as a "forward pixel kill" test, e.g. as described in United States Patent Application Publication No. 2019/0088009 (Arm Limited).

Surviving fragments pass to a warp manager 43, which operates to issue appropriate groups of execution threads ("warps") to execution engine 44 for execution.

In the present embodiment, the execution engine 44 executes a shader program for each execution thread issued to it to generate appropriate render output data, including colour (red, green and blue, RGB) and transparency (alpha, a) data. The shader program is provided by the application 21 and may be complied for execution by the driver 22.

The threads in one group of execution threads ("warp") each execute the shader program in lockstep, one instruction at a time. Grouping execution thread into groups in this manner can improve the execution efficiency of the execution engine 44, because it is possible to share instruction fetch and scheduling resources between all the threads in the group.

In the case of the fragment shader 6, the fragment shading program that is being executed can be run once for each set of one or more sampling positions (or points) that is to be processed, with one execution thread being spawned for each set of one or more sampling positions. The sampling positions (and thus accordingly their corresponding execution threads) may be organised into and processed as groups of plural sampling positions (and thus threads), each corresponding to the sampling positions associated with a set of one or more graphics fragments.

In the present embodiment, the sets of sampling positions are organised into 2×2 blocks of sampling position "quads". Groups of four "quads" are then processed in the fragment shader 6 as respective thread groups ("warps"), with each thread group ("warp") accordingly including a total of sixteen threads corresponding to sixteen respective sets of sampling positions (four 2×2 "quads" of sampling positions). The sixteen threads in a thread group ("warp") then execute the fragment shader program in lockstep, one instruction at a time. Other groupings of threads would of course be possible.

Typically, each thread in a thread group ("warp") will correspond to, and calculate render output data for, a fixed set of one or more sampling points in the render output. However, in the present embodiment, the number of sampling points (e.g. pixels) that a thread corresponds to depends on the shading rate that is used. To facilitate this, the pipeline (e.g. the warp manager 43 or a processing stage in communication with the warp manager 43, such as e.g. the ZS unit 5) operates to generate thread groups ("warps") based on a shading rate.

For example, when a 1×1 shading rate is to be used, the pipeline (e.g. the warp manager 43) generates a thread group ("warp") that includes one or more threads which will each execute the shader program to generate render output data for one or more sampling points in the render output corresponding to a respective single fine pixel. When a 1×2 shading rate is used, however, the pipeline (e.g. the warp manager 43) generates a thread group ("warp") that includes one or more threads that will each execute the shader program to generate render output data for sampling points in the render output corresponding to a respective 1×2 coarse pixel. Other shading rates will be handled in a corresponding manner.

Thus, the execution engine 44 can execute execution threads that represent fine pixels and, where a coarser shading rate is being used, execution threads that represent coarse pixels. Correspondingly, the warp manager 43 issues threads appropriately to the execution engine 44 for execution. The warp manager 43 also stores (in memory 25) information indicating the shading rates associated with thread groups ("warps") issued thread to the execution engine 44.

The execution engine 44 then executes the execution threads within thread groups ("warps") appropriately so as to perform the appropriate shading operations and generate the appropriate render output data for each execution thread, i.e. including colour (red, green and blue, RGB) and transparency (alpha, a) data.

Output data generated by the execution engine 44 is then written appropriately to the tile buffer 9 (as described above). If blending is required, any necessary blending operations with data already stored in the tile buffer is performed by blender stage 8, and the blended data is then written to the tile buffer 9 (as described above).

The shading rate information (which may be stored in the memory 25) may again be read and used to control this writing out of data. For example, in the case of a 1×1 shading rate, a single set of output data values will be written to one or more sampling points in the tile buffer 9 corresponding to a (only) single fine pixel. In the case of a coarser shading rate, a single set of output data values will be written to sampling points in the tile buffer corresponding to a block of plural fine pixels. For example, in the case of a 1×2 shading rate, a single set of output data values will be written to sampling points in the tile buffer corresponding to a block of 1×2 fine pixels. Other shading rates will be handled in a corresponding manner.

Thus, the (blended) output data (values) are written to the tile buffer 9 from where they can, for example, be output to a frame buffer for display. Output Z depth values are also written appropriately to a Z buffer within the tile buffer 9.

As also shown in FIG. 4, the warp manager 43 include a fragment dependency manager 45 that is operable to track and enforce dependencies between different quads that are to be processed for the same set of sampling point(s) (at the same "quad position" in the array of sampling points). The fragment dependency manager 45 is configured to ensure that quads that (when processed by the execution engine 44) will generate output data for the same set of one or more sampling points are processed by the execution engine 44 in the correct, desired order.

To do this, the fragment dependency manager (FDM) 45 is configured to maintain a set of plural queues, with one queue per quad position. In particular, the fragment dependency manager (FDM) 45 can use a doubly linked list data structure to manage pixel dependencies for quads at each quad location. This is illustrated by FIG. 5.

Figure 5:
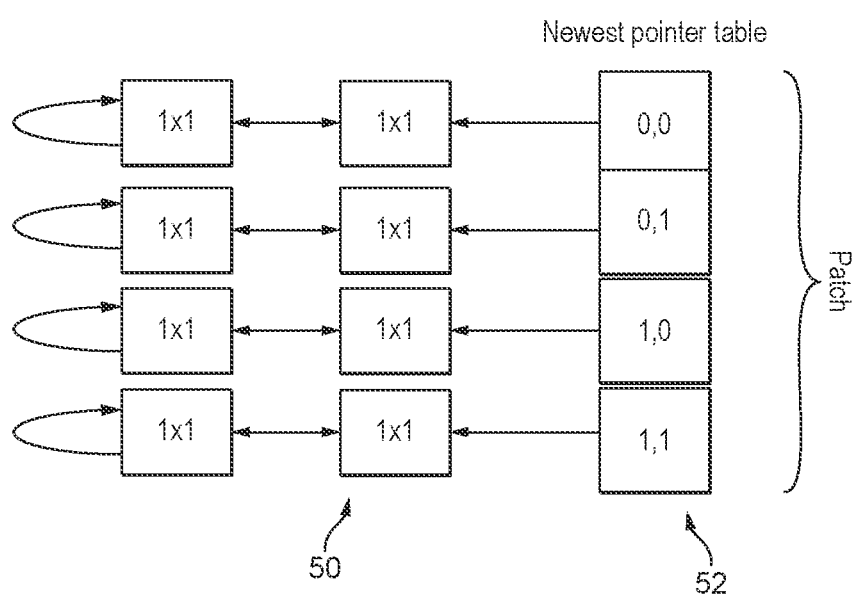
FIG. 5 shows schematically a linked list data structure that may be used to track fragment dependencies in accordance with embodiments.

FIG. 5 shows a set of queues 50, in the form of a doubly linked list data structure, for a 2×2 patch of quad positions. In the present embodiment, each such patch may correspond to a 4×4 pixel area in the screen resolution (i.e. a 4×4 block of output pixels in the array of output pixels). This may include 16 sample points (where there is one sample point per output pixel, e.g. where 1×MSAA (multisampled antialiasing) is being used).

As described above, the sampling points are organised into four 2×2 blocks of sampling position "quads", and so the data structure shown in FIG. 5 includes four independent doubly linked lists 50, one for each quad position.

As shown in FIG. 5, the doubly linked list data structure includes a newest pointer table 52, which is the head of each linked list, and is effectively the insertion point for new quads. New quads are inserted at the newest pointer table 50 and extracted from the list when the quad is retired (either when the shader has completed or when the quad is discarded). Discarded quads results in the complication that an entry can be removed from anywhere in the linked list, not just the "oldest" end.

The fragment dependency manager (FDM) 45 ensures that processing of threads by the execution engine 44 (e.g. at least the processing which needs to be performed in a correct order relative to other threads, such as for example late depth processing and/or blending) is done according to the position of their entries in the queues. In particular, only the quad with the oldest entry in any given queue will be processed in respect of processing which needs to be performed in a correct order by the execution engine 44. In the present embodiment, this may involve a thread being allowed to execute (shader) program instructions up to a point (or points) which needs to be performed in a correct order. At this point(s), the thread may be prevented from executing further (shader) program instructions until its entry is the oldest in a queue.

As shown in FIG. 5, each queue entry corresponds to a so called "fine quad", i.e. a 2×2 group of fragments in respect of a 2×2 group of fine pixels. Each fine quad ("1×1 quad") corresponds to a 2×2 set of sample points (where there is one sample point per output pixel, e.g. where 1×MSAA (multisampled anti-aliasing) is being used), and corresponds to 4 threads to be shaded. As also shown in FIG. 5, each quad location linked list is tracked independently.

This is particularly suitable for the situation (such as in conventional graphics processing) where each graphics fragment will generate rendered fragment data in respect of only one output pixel in the screen space resolution.

However, as described above, with the inclusion of variable rate shading (VRS), quads can have a variable screen space footprint. In VRS, shading can be done at a coarser granule, which means that a single fragment thread can be issued for several covered pixels (where the output of this thread is broadcast to all covered samples, i.e. to multiple pixels in the output render target). This breaks the one to one mapping between fragment threads and covered pixels.

Figure 6:
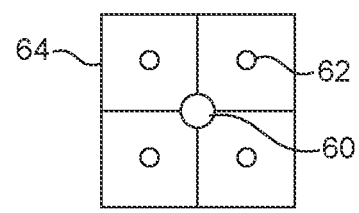
FIG. 6 shows schematically a VRS coarse pixel in accordance with embodiments.

For example, FIG. 6 illustrates schematically a 2×2 coarse pixel. As shown in FIG. 6, a single fragment (thread) 60 is processed in respect the coarse pixel, where the fragment 60 has a 2×2 set of sampling points 62 associated with it, and where the coarse pixel corresponds to a 2×2 set of output pixels 64.

Correspondingly, a "course quad" is a 2×2 group of fragments in respect of a 2×2 group of coarse pixels. Each 2×2 coarse quad ("2×2 quad") corresponds to a 4×4 set of sample points (where there is one sample point per output pixel, e.g. where 1×MSAA (multisampled anti-aliasing) is being used), and corresponds to 4 threads to be shaded. Thus, with 2×2 VRS shading, a coarse quad will cover a larger area, namely 16 samples in 1×MSAA in a 4×4 pattern.

In VRS, the shading rate can be varied by per-drawcall, per-screen space location and per-vertex. The shading rate can also or instead be varied based on one or more other properties. This means that it is possible for primitives at the same quad location to have different shading rates. Thus, with VRS, on a particular quad position, there may be quads with different screen space footprints.

Figure 7:
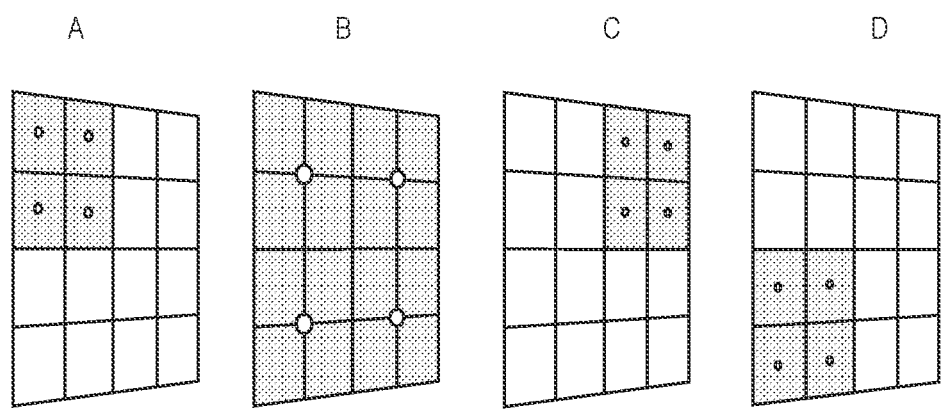
FIG. 7 shows schematically a sequence of VRS coarse and fine pixels in accordance with embodiments.

This is illustrated by FIG. 7. FIG. 7 shows a sequence of quads for processing in respect of a 2×2 patch of quad positions. In particular, FIG. 7 shows a first fine quad (A), followed by a 2×2 coarse quad (B), then a second fine quad (C), and a third fine quad (D). In FIG. 7, the first fine quad (A) is the oldest. The 2×2 coarse quad (B) depends on the first fine quad (A) since it has overlapping coverage. The second fine quad (C) depends on the 2×2 coarse quad (B) since it has overlapping coverage. The third fine quad (D) does not depend on the second fine quad (C), but it does depend on the 2×2 coarse quad (B).

Hence, with the inclusion of VRS there is also the inclusion of inter-quad pixel dependencies. This means that the FDM 45 needs to be able to handle dependencies between differently sized quads which cover the same quad location. Although it would be possible to simply always track dependencies at the largest possible VRS shading rate, this has been shown to introduce lots of false dependencies and leads to poor performance.

Embodiments provide efficient algorithms to handle these new inter-quad dependencies. In particular, embodiments introduce a mechanism to adaptively change the fragment dependency tracking granule in order to enforce true cross quad location dependencies as well as to avoid most false dependencies in the case of variable rate shading.

Various embodiments described below use the 2×2 VRS rate as an example, but embodiments are extendable to all possible VRS rates.

Figure 8:
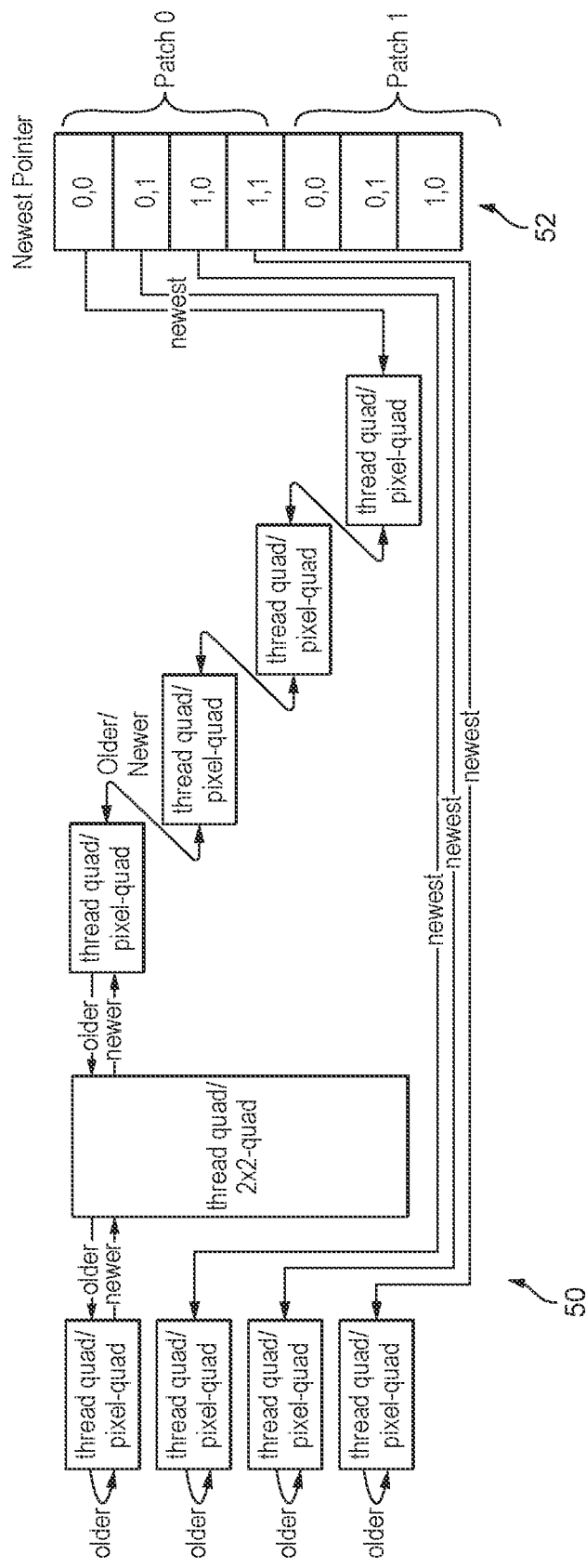
FIG. 8 shows schematically a linked list data structure that may be used to track fragment dependencies in accordance with embodiments.

FIG. 8 illustrates a first embodiment, in which a doubly linked data structure 50 (similar to the one depicted in FIG. 5) is used to track quad dependencies, but where the resolution at which quads are tracked is adaptively increased, depending on the VRS rate of the quads presented at an input to the fragment dependency manager 45.

In the example shown in FIG. 8, there are four fine quads, which are the oldest entry in the lists at quad locations (0,0), (0,1), (1,0) and (1,1). Following this, there is an entry in respect of a 2×2 coarse quad. As illustrated in FIG. 8, the 2×2 coarse quad is added to the list at quad location (0,0), and the other lists at quad locations (0,1), (1,0) and (1,1) are retired, i.e. such that no further entries are added to those lists.

Instead, further entries area added to the list at quad location (0,0), regardless of the actual location of the quad. That is, quads after the 2×2 quad are inserted in a single linked list, regardless of their position within the coarse quad area. Thus, in effect, an entry is respect of a coarse quad is added to a list, and the lists at quad locations (0,0), (0,1), (1,0) and (1,1) are consolidated into a single list.

In the example depicted in FIG. 8, the 2×2 quad will become oldest when it is oldest in the linked list, and also when the lists at the other three positions (other than (0,0)) within the coarse quad area are empty.

In this embodiment, the dynamic adjustment only works one way, i.e. the tracking can move from a finer granularity of tracking to a coarser granularity. Returning back to finer granularity tracking can be achieved either when no entries are present at the tracking patch positions, or during a change of virtual tile.

In this embodiment, since the tracking is always at a VRS rate granularity, then not all false dependencies can be overcome. Thus, as an optimization to this approach, it is possible to use the rasteriser coverage mask to reduce the number of dependencies created. Such dependencies are false dependencies and can be avoided. For example, a local VRS rate can be used that forms a bounding box around all the covered pixels.

These embodiments do not require a significant increase in stored state and combinational logic. Thus, these embodiments come at minimal area and complexity, but can suffer from false dependencies.

Figure 9:
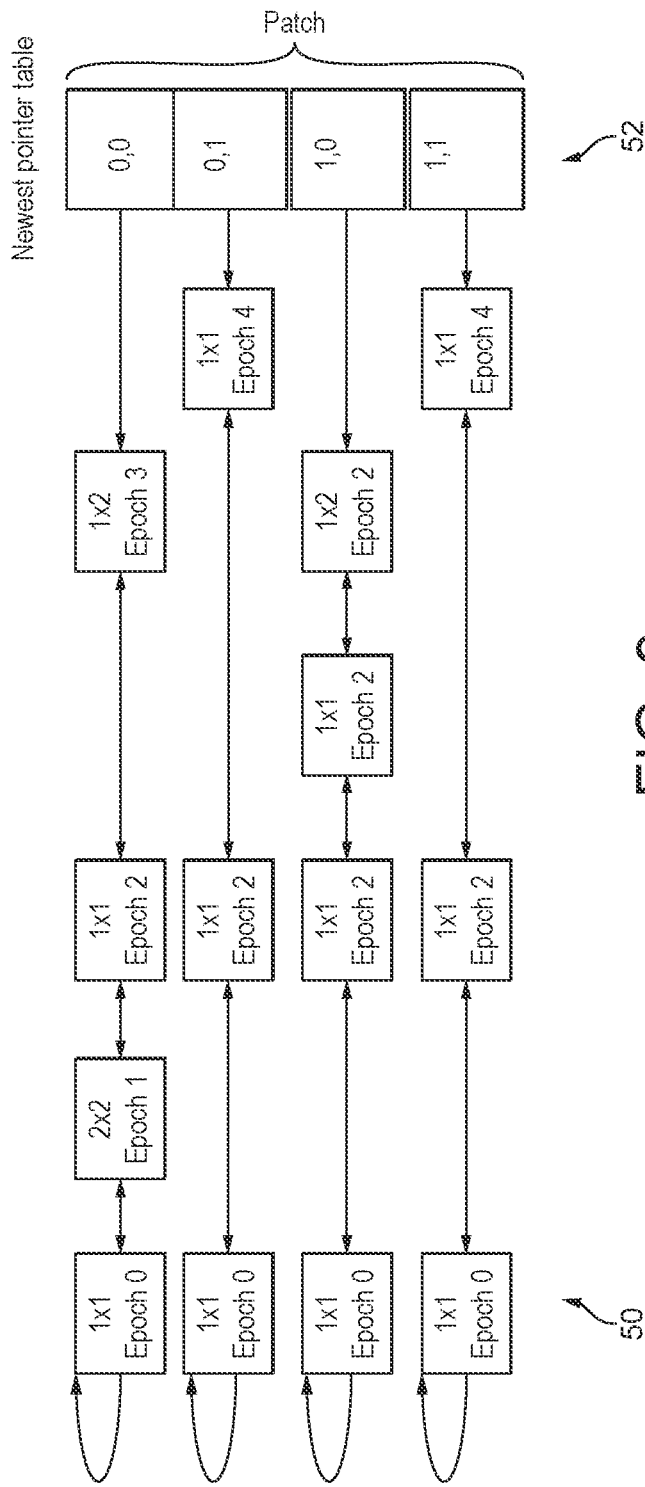
FIG. 9 shows schematically a linked list data structure that may be used to track fragment dependencies in accordance with embodiments.

FIG. 9 illustrates a second embodiment, which introduces a mechanism which uses an adaptive FDM tracking granule. This mechanism allows the tracking granule to be increased and decreased, so that cross quad location dependencies can be enforced. These cross quad location dependencies occur when the VRS rate changes.

The FDM 45 tracks insertion and extraction separately. This allows the FDM 45 to insert quads using a different tracking granule than extraction.

In this embodiment, each quad keeps track of its "epoch number" which is additional state. The epoch number is a sequencing number which is used to capture dependencies between different epochs. The epoch changes whenever the VRS rate in the patch changes.

At insert into the linked list 50, a check is made as to whether the new quad has a different VRS rate from the previously inserted ones in the same patch. If so, the epoch number is incremented, and the quad is inserted. The insertion logic can be optimized to account for the coverage of the inserted quads to avoid incrementing the epoch counter (which introduces dependencies) if inserted quads with different VRS rates do not overlap in quad location. At the extraction stage, the current epoch must drain before moving on to the next epoch.

FIG. 9 shows a particular example of FDM linked lists within a patch with variable shading rates. New quads are inserted at the newest pointer table 52.

Note that, in FIG. 9, the 2×2 quad in "epoch 1" depends on all of the 1×1 quads in "epoch 0". This is a correct dependency and is enforced by the increased epoch counter. This represents an increase in the tracking granule.

The leftmost 1×1 quads in "epoch 2" all depend on the 2×2 quad in "epoch 1". Due to the epoch dependency, the 2×2 quad must drain before the "epoch 3" quads become oldest. This is again a true dependency which is enforced by the epoch mechanism. This represents a decrease in the tracking granule.

Note that there is a false dependency between the top "epoch 3" quad and the last 1×1 quad in "epoch 2" at location (1,0), even though there is no overlap in coverage. This represents the remaining false dependencies in this algorithm.

This epoch based algorithm according to this embodiment has been shown to have close to optimal performance for a wide range of content. The remaining false dependencies do not degrade the performance to a high degree.

Figure 10:
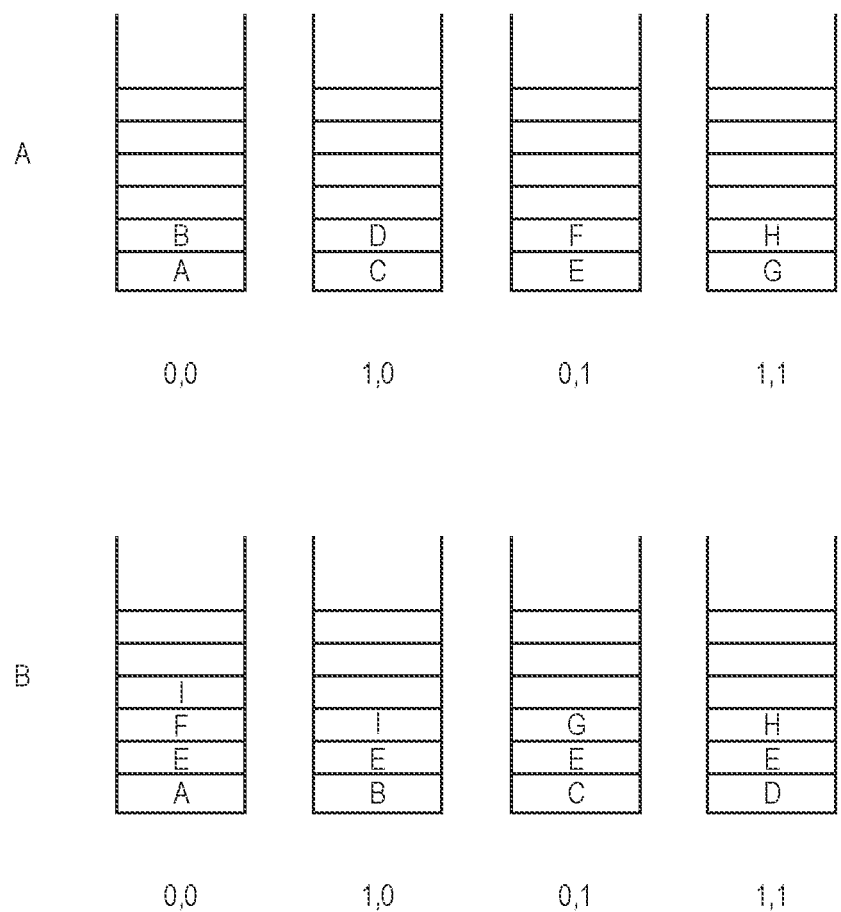
FIG. 10 shows schematically an array data structure that may be used to track fragment dependencies in accordance with embodiments.

FIG. 10 illustrates an alternative approach that uses fixed size arrays.

This approach introduces an array for each quad location. This array holds a quad identifier. At warp creation, an entry for each quad is inserted at the back of the array corresponding to its position.

FIG. 10 illustrates schematically four arrays at fine quad locations (0,0), (1,0), (0,1) and (1,1). In the example shown in FIG. 10A, all the quads are fine quads and there are no inter quad dependencies. Once an entry becomes the head of the array, it has no more dependencies.

As described above, in the case of VRS a coarse quad will cover multiple fine quad locations. In this case, multiple entries are made, one in each array of covered quad locations. When warps have completed shading or have been discarded, its entry in the corresponding FDM array is removed.

Once an entry becomes the head of the array, it is now the oldest on this location and should be allowed to progress past its dependency barrier. In the case of VRS coarse quads, the quad needs to become the head of all covered quad location arrays in order to be allowed to make progress past its dependency barrier.

Referring to FIG. 10B, note that quads A, B, C and D and fine quads without dependencies. Quad E is a 2×2 coarse quad which covers all locations in the patch. All later quads in all arrays must wait for this one to complete.

Once quad E has completed, the 1×2 quad I is not available to make progress even though it would be oldest at the (1,0) location since it is blocked by quad F at the (0,0) location. Once also F have completed quad I has resolved all its dependencies.

As an optimization it is possible to use the rasterizer coverage mask to reduce the number of FDM array entries needed for coarse quads, since if there is no pixel coverage, later quads at that location should not depend on the present quad. Such dependencies are false dependencies and can be avoided. In these embodiments, since the tracking is always at fine quad granularity, then the optimum number of "fine quad" entries can be inserted, based on coverage, regardless of the shape of the coverage.

Figure 11:
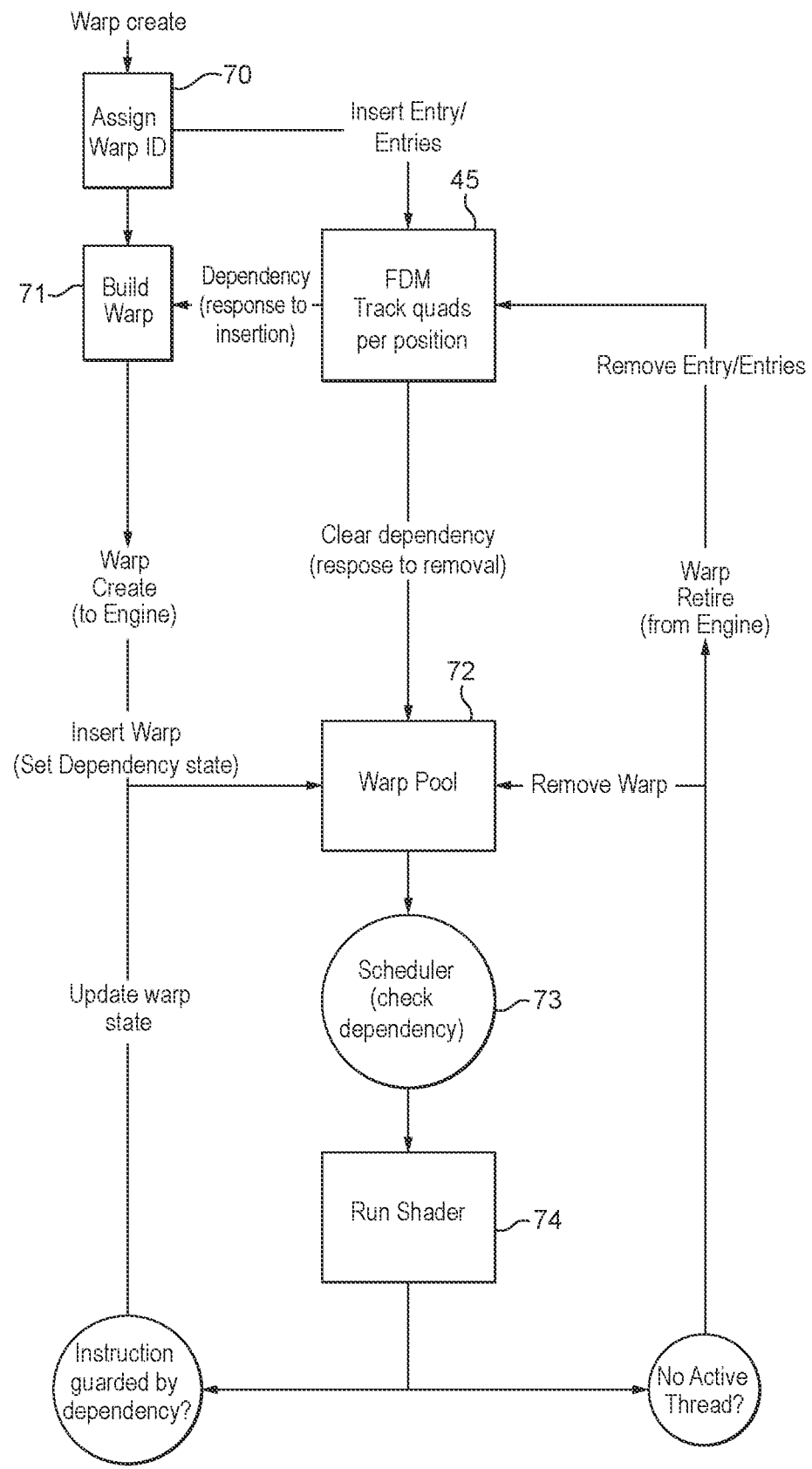
FIG. 11 shows schematically part of a warp manager configured in accordance with embodiments.

FIG. 11 illustrates in detail a warp manager 43 configured in accordance with these embodiments. As illustrated in FIG. 11, when the warp manager 43 is to create a new warp, the new warp is initially assigned 70 a Warp ID, and the warp is built 71. The Warp ID is an input to the fragment dependency manager ("FDM") 45, which (as described above) is configured to track quads at each position. For each warp, one or more entries are added to corresponding lists held by the FDM 45 in respect of each quad in the warp.

In response to the insertion of a warp, the FDM 45 may output a dependency count for that warp (as will be described in more detail below).

The dependency count (and the Warp ID) are used when building 71 the warp. Built warps are inserted into a warp pool 72, with a dependency state set for the warp.

Warps can be removed from the warp pool 72, e.g. where a warp is completed (or culled). In this case, the corresponding entry or entries are removed from the corresponding queue maintained by the FDM 45. When this occurs, if appropriate, dependency(ies) can be cleared in response to the removal of the warp entry or entries.

A scheduler 73 is configured to check the dependency of warps in the pool before sending a warp to the execution engine 44 for execution 74. Once a shader has been executed 74 for a thread of the warp, (e.g. if an instructions is guarded by a dependency), the appropriate warp state is updated. Where there is no active thread within the warp, the warp is retired.

Figure 12:
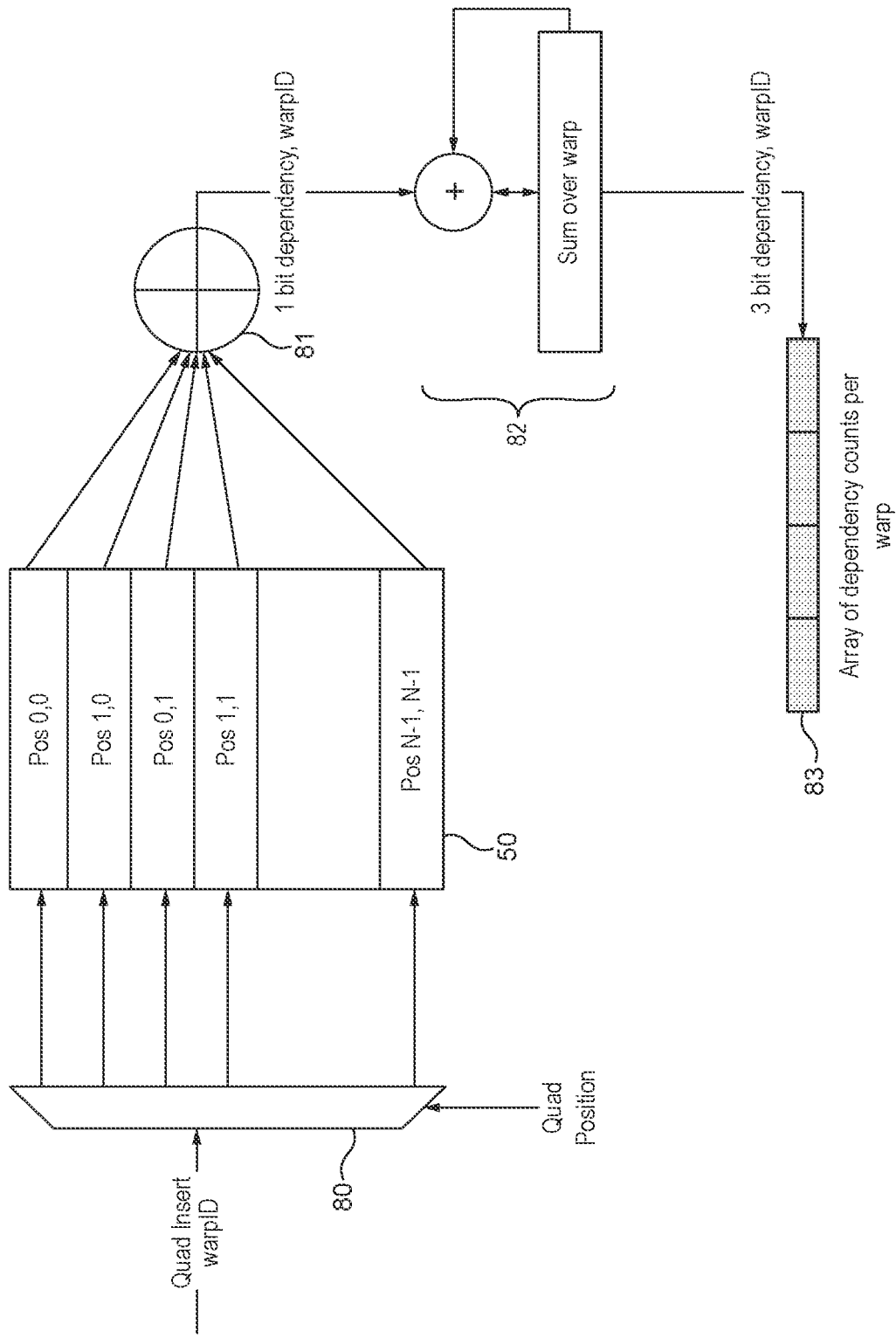
FIG. 12 shows schematically a process of adding entries to queues in accordance with embodiments.

FIG. 12 illustrates the process of adding entries to each queue.

As illustrated by FIG. 12, the fragment dependency manager 45 maintains a queue structure 50 in respect of each quad position, e.g. N×N queue structures in respect of an N×N array of quad positions (i.e. an independent queue in respect of position 0,0; position 1,0; position 1,0; position 1,1; . . . ; position N−1,N−1).

As illustrated by FIG. 12, each quad generated by the warp manager 43 is initially presented to an input 80 of the fragment dependency manager 45. Each quad is identified by the WarpID of the parent warp alongside an offset within the warp. Thus, for the case where there are multiple quads within a warp, the Quad ID is {WarpID, Quad offset}. The position of the quad is also presented to the input 80 of the fragment dependency manager 45.

Based on the quad position, the fragment dependency manager 45 inserts an entry into a single one of the queue structures 50. Each queue structure in effect tracks the order of quads at the position corresponding to the queue. As the execution engine 44 will only process a quad when its entry is at the head of a queue, this has the effect of enforcing dependencies between different quads that are to be processed for the same position.

If, when an entry is added to a queue, there are any dependencies (i.e. quads at the same position that were presented earlier and are still active), then a single bit is output for that position, and subjected to a simple OR operation 81 over all positions. In the present embodiment, since only one entry is inserted to a queue per quad, then the OR operation 81 over all positions gives the dependency count for that quad. As shown in FIG. 12, the output of the OR operation 81 is a 1 bit dependency and the warpID.

If there are multiple quads within a warp, then the dependencies are accumulated (summed) 82 for the whole warp. In the present embodiment, with up to 4 quads per warp, then the count must be up to 4 (and so can be represented using 3 bits). Finally, the (3 bit) dependency count for the warp is written into an array 83 indexed by warpID.

As described above, an entry may be removed from a queue when the corresponding quad has been submitted for processing by the execution engine 44. In addition, an entry may be removed from a queue when it is determined that the corresponding quad can be culled or "killed" (i.e. its processing can be stopped) for some other reason (as described above).

Figure 13:
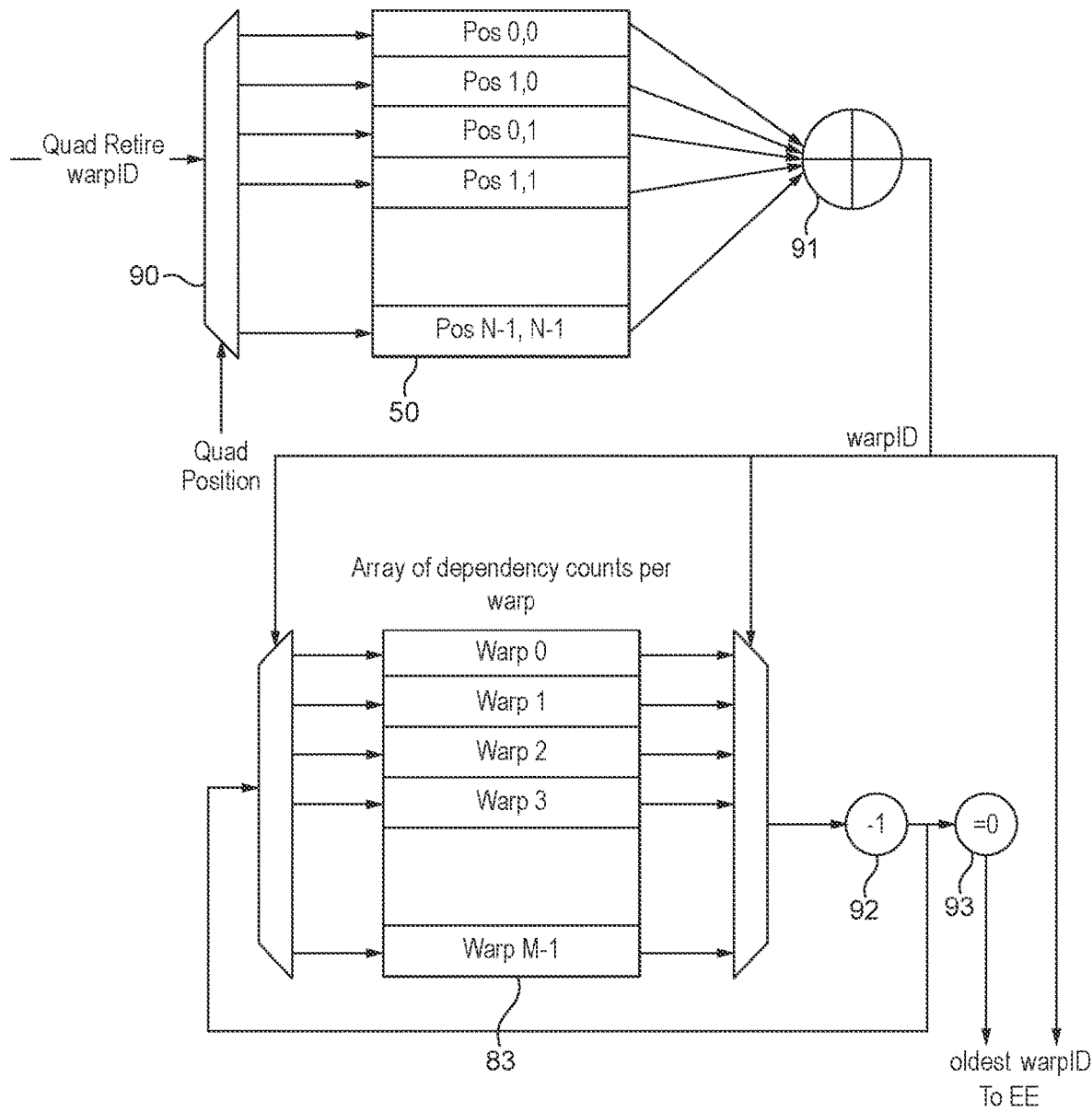
FIG. 13 shows schematically a process of removing entries from queues in accordance with embodiments.

This process of retiring a quad is illustrated in FIG. 13.

As shown in FIG. 13, when a quad is to be retired, it is firstly presented to a retire input 90 of the fragment dependency manager 45. Again, a quad is identified by the WarpID of the parent warp alongside an offset within the warp (and, for the case where there are multiple quads within a warp, the Quad ID is {WarpID, Quad offset}). The position of the quad is also presented to the retire input 90 of the fragment dependency manager 45.

Based on the quad position, the corresponding entry is removed from the corresponding single queue structure of the plural queue structures 50.

In addition, if there are any dependencies (i.e. quads at the same position that were presented later and are still active), then a single bit is output for that warpID indicating that a dependency has been released. In the present embodiment, since only one entry is inserted/removed per quad then the simple OR operation 91 over all positions gives the dependency update for that quad.

If there are multiple quads within a warp, then the accumulated dependencies for the whole warp are retrieved from the array 83 holding the accumulated dependency per warp (which array 83 is indexed by warpID).

The dependency count is then decremented 92 by one, and the updated dependency count for the warp is written back into the array indexed by warpID 83.

In addition, if 93 the updated dependency count for the warp is zero, then an oldest message is sent to the execution engine 44 for the warp identified by warpID. This means that the execution engine 44 is now free to process the warp in question.

Figure 14:
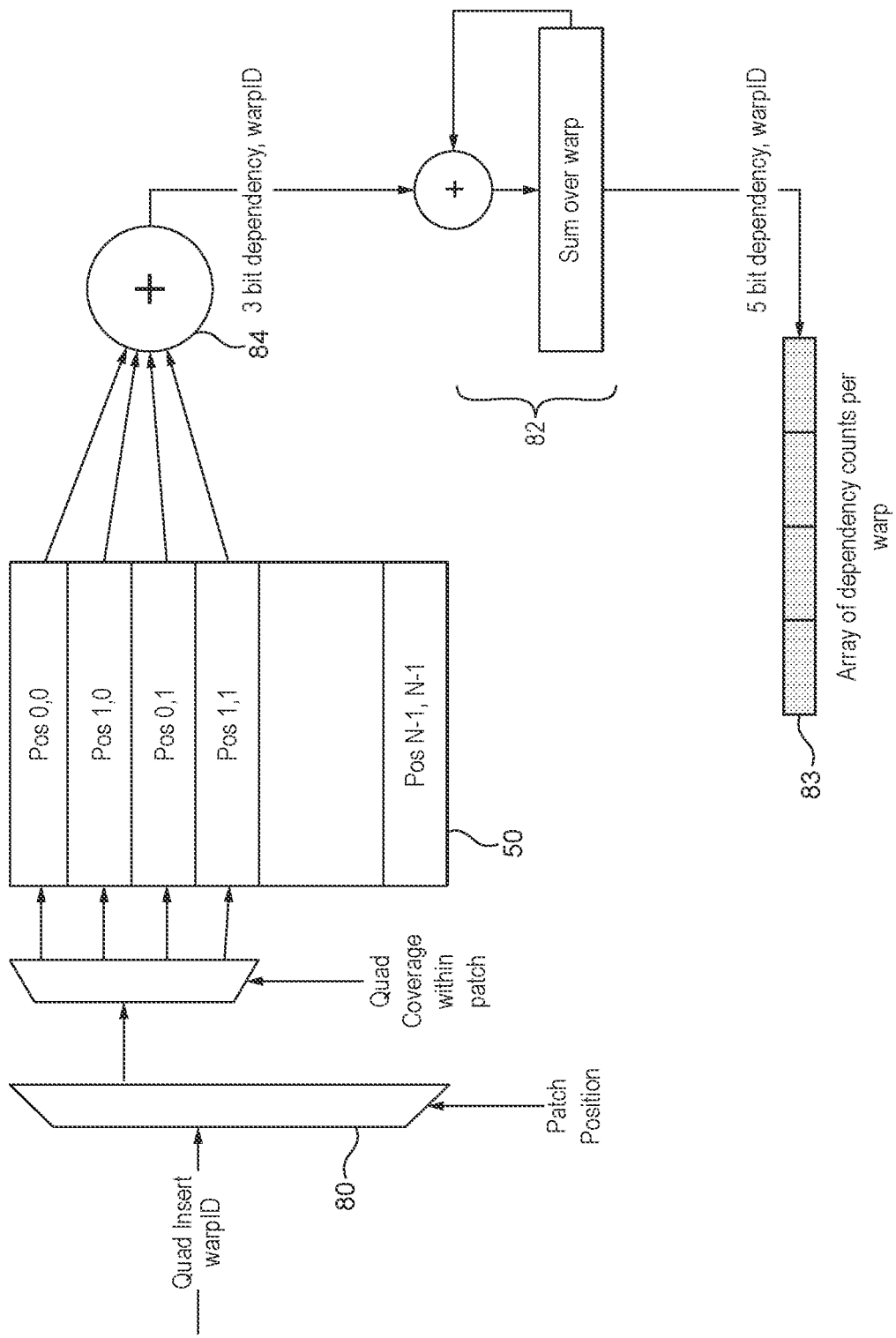
FIG. 14 shows schematically a process of adding entries to queues in accordance with embodiments.

FIG. 14 illustrates schematically the operation of the dependency manager 45 where VRS quads are being tracked.

As shown in FIG. 14, a quad is initially presented to the input 80 of the fragment dependency manager 45. At this stage, a quad is identified by the WarpID of the parent warp alongside an offset within the warp. Thus, for the case where there are multiple quads within a warp, the Quad ID is {WarpID, Quad offset}. The position of the quad is also presented to the input 80 of the fragment dependency manager 45.

Based on the quad position, a set of entries (coarse position) is selected in a structure 50 that tracks order. In this case, the diagram shows a set of 4 fine positions within the set.

Based on the coverage, an entry is inserted into each fine position that has coverage. This may be from 0 to 4 in the system shown (although a quad with no coverage would not need to be presented to input).

If there are any dependencies (quads at same position that were inserted earlier and are still active) then a single bit per fine position is output for that position.

Since in the present embodiment, multiple entries may be inserted per quad, then a simple sum 84 over all fine positions within the patch gives the dependency count for that quad. For the present embodiment, with 4 fine positions per coarse position, the count must be up to 4 (3 bits).

If there are multiple quads within a warp then the dependencies are accumulated 82 for the whole warp. In the present embodiment, with up to 4 quads per warp, then the count must be up to 16 (5 bits). Finally, the dependency count for the warp is written into an array indexed by warpID 83.

Figure 15:
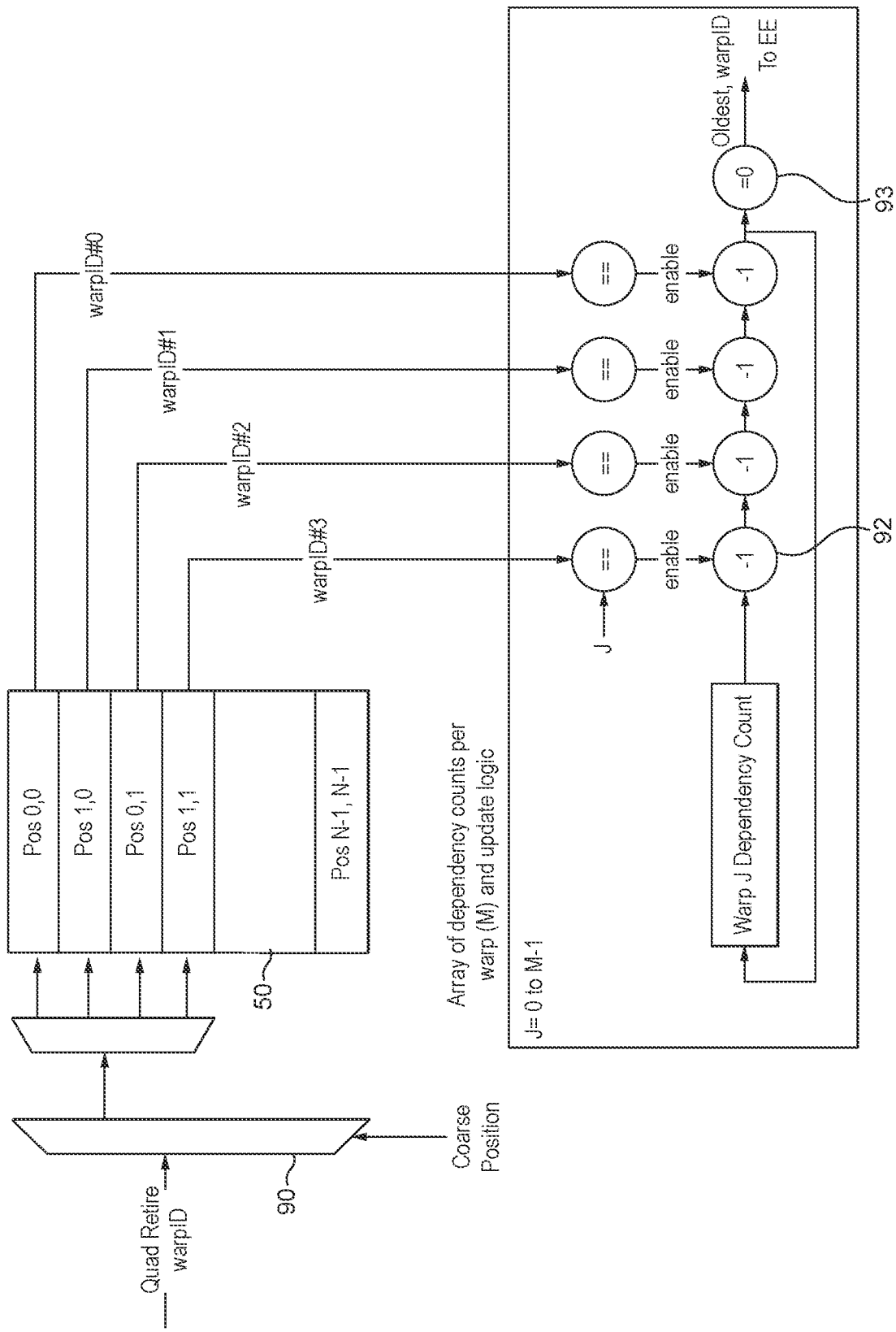
FIG. 15 shows schematically a process of removing entries from queues in accordance with embodiments.

FIG. 15 illustrates the corresponding process of retiring VRS quads.

As shown in FIG. 15, a quad is presented to the retire input 90 of the fragment dependency manager 45. Again, a quad is identified by the WarpID of the parent warp alongside an offset within the warp. Thus, for the case where there are multiple quads within a warp, the Quad ID is {WarpID, Quad offset}. The position of the quad is also presented to the retire input 90 of the fragment dependency manager 45.

Based on the position and size of the quad, a set of entries (coarse position) is selected in a structure 50 that tracks order. In this case the diagram shows a set of four fine positions within the set. The retire input is presented to all positions within the set. A quad may be removed from multiple positions within the set of position.

If there are any dependencies (quads at same position that were inserted later and are still active) then a single bit is output for that later warpID indicating that a dependency has been released, for each position within set that this applies. In the present embodiment, up to four dependencies may be released at same time. The four dependency updates may refer to from one to four different warps.

For each entry in table indexed by warpID that matches one of the update warpIDs, the count is decremented 92 by one. All four updates may act on a single warp, in which case the count will be decremented by four.

If 93 the updated dependency count for the any warp is zero, then an oldest message is sent to the EE for the warp identified by warpID.

Figure 16:
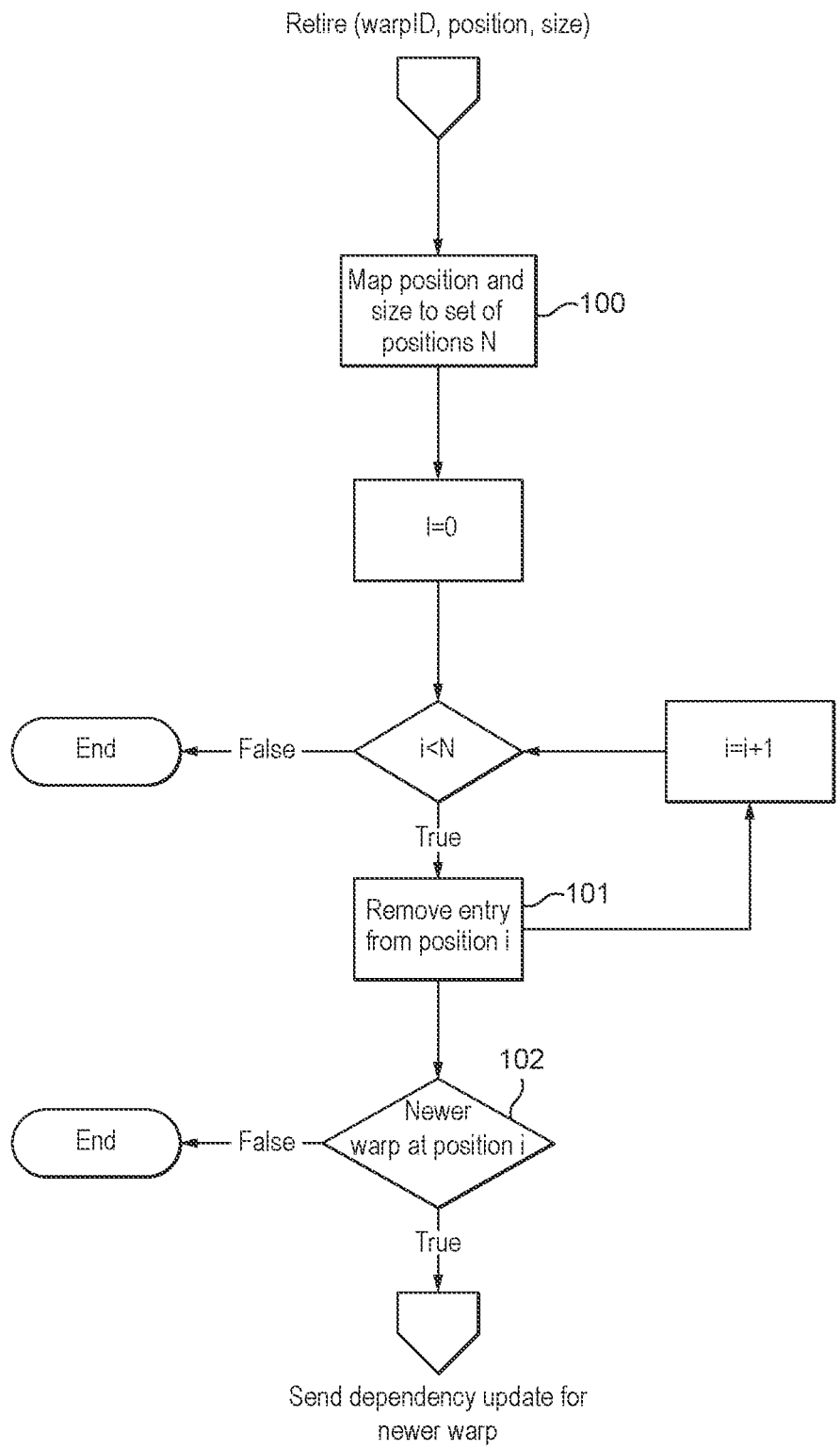
FIG. 16 shows schematically a process of removing entries from queues in accordance with embodiments.

FIG. 16 is a flowchart which again illustrates the process of retiring VRS quads. As shown in FIG. 16, when a quad is presented to the retire input 90 of the fragment dependency manager 45, its position and size are mapped 100 to N positions of the set of positions for the structure 50 that tracks order. Then, for each position, i, within the set of N positions, an entry is removed from that structure 50 at that position. Then, a check is made 102 as to whether there are any dependencies at the position i (quads at same position that were inserted later and are still active), and if so, a single bit is output for that later warpID indicating that a dependency has been released (as described above).

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical applications, to thereby enable others skilled in the art to best utilise the technology, in various embodiments and with various modifications as are suited to the particular use contemplated. It is intended that the scope be defined by the claims appended hereto.

What is claimed is:

1. A method of operating a graphics processor that comprises:
a rasteriser configured to rasterise input primitives to generate graphics fragments to be processed, each graphics fragment having one or more sampling points of an array of sampling points associated with it;
a renderer configured to process fragments generated by the rasteriser to generate rendered fragment data; and
a fragment dependency manager operable to maintain plural queues, wherein each queue corresponds to a respective block of one or more fine pixels corresponding to a respective set of plural sets of one or more sampling points that the array is divided into, and wherein each queue entry is indicative of one or more fragments that when processed by the renderer will produce rendered fragment data for one or more of the sampling points of the set of one or more sampling points to which the queue corresponds;
the method comprising:
the rasteriser generating graphics fragments; and
for each of one or more graphics fragments, the fragment dependency manager adding an entry indicative of the graphics fragment or a group of graphics fragments to at least one queue;
wherein for a graphics fragment or group of graphics fragments that corresponds to a block of one or more coarse pixels and that when processed by the renderer will produce rendered fragment data for sampling points of two or more sets of the plural sets of one or more sampling points, the method comprises:
the fragment dependency manager adding one or more first entries indicative of that graphics fragment or group of graphics fragments to at least one of the queues that correspond to the fine pixels covered by the block of one or more coarse pixels corresponding to the two or more sets; and the fragment dependency manager, for a subsequent graphics fragment or group of graphics fragments that when processed by the renderer will produce rendered fragment data for one or more sampling points of the two or more sets, preventing at least some processing of the subsequent graphics fragment or group of graphics fragments by the renderer until the one or more first entries have been removed from the at least one queue.

2. The method of claim 1, wherein the method comprises:

for a graphics fragment or group of graphics fragments that corresponds to a block of one or more coarse pixels and that when processed by the renderer will produce rendered fragment data for sampling points of two or more sets of the plural sets of one or more sampling points, the fragment dependency manager adding a first entry to a first queue of the two or more queues that correspond to the fine pixels covered by the block of one or more coarse pixels corresponding to the two or more sets; and the fragment dependency manager retiring one or more of the other queue or queues of the two or more queues.

3. The method of claim 2, further comprising:

for a subsequent graphics fragment or group of graphics fragments that when processed by the renderer will produce rendered fragment data for one or more sampling points of the two or more sets, the fragment dependency manager adding a second entry to the first queue.

4. The method of claim 1, further comprising:

the fragment dependency manager determining when a queue entry is to be added to a set of queues that corresponds to a different number of sets of one or more sampling points than the queue entry that was previously added to the set of queues;

when it is determined that a queue entry is to be added to the set of queues that corresponds to a different number of sets of one or more sampling points than the queue entry that was previously added to the set of queues: the fragment dependency manager changing a counter value, and associating the counter value with the queue entry; and the renderer processing graphics fragments depending on the counter value.

5. The method of claim 4, further comprising the fragment dependency manager changing the counter value when a queue entry is to be added to the set of queues that is indicative of a fragment or group of fragments that has a different shading rate to the previous fragment or group of fragments for which an entry was added to the set of queues.

6. The method of claim 1, wherein the plural queues comprise a linked list data structure, and each queue comprises a respective linked list of the linked list data structure.

7. The method of claim 1, wherein the method comprises:

for a graphics fragment or group of graphics fragments that corresponds to a block of one or more coarse pixels and that when processed by the renderer will produce rendered fragment data for sampling points of two or more sets of the plural sets of one or more sampling points, the fragment dependency manager adding a first entry to each of two or more of the two or more queues that correspond to the fine pixels covered by the block of one or more coarse pixels corresponding to the two or more sets; and the renderer performing at least some processing for a graphics fragment or group of graphics fragments when all the entries in respect of that graphics fragment or group of graphics fragments are the oldest in their respective queues.

8. The method of claim 7, comprising the fragment dependency manager adding a first entry to each of the two or more queues that correspond to sampling points covered by the graphics fragment or group of graphics fragments.

9. The method of claim 7, wherein the plural queues comprise an array data structure, and each queue comprises a respective array of the array data structure.

10. A graphics processor configured to execute a graphics processing pipeline comprising:

a rasteriser configured to rasterise input primitives to generate graphics fragments to be processed, each graphics fragment having one or more sampling points of an array of sampling points associated with it;

a renderer configured to process fragments generated by the rasteriser to generate rendered fragment data; and a fragment dependency manager operable to maintain plural queues, wherein each queue corresponds to a respective block of one or more fine pixels corresponding to a respective set of plural sets of one or more sampling points that the array is divided into, and wherein each queue entry is indicative of one or more fragments that when processed by the renderer will produce rendered fragment data for one or more of the sampling points of the set of one or more sampling points to which the queue corresponds;

wherein the fragment dependency manager is configured to:

for each of one or more graphics fragments generated by the rasteriser: add an entry indicative of the graphics fragment or a group of graphics fragments to at least one queue;

for a graphics fragment or group of graphics fragments that corresponds to a block of one or more coarse pixels and that when processed by the renderer will produce rendered fragment data for sampling points of two or more sets of the plural sets of one or more sampling points: add one or more first entries indicative of that graphics fragment or group of graphics fragments to at least one of the queues that correspond to the fine pixels covered by the block of one or more coarse pixels corresponding to the two or more sets; and for a subsequent graphics fragment or group of graphics fragments that when processed by the renderer will produce rendered fragment data for one or more sampling points of the two or more sets: prevent at least some processing of the subsequent graphics fragment or group of graphics fragments by the renderer until the one or more first entries have been removed from the at least one queue.

11. The graphics processor of claim 10, wherein the fragment dependency manager is configured to:

for a graphics fragment or group of graphics fragments that corresponds to a block of one or more coarse pixels and that when processed by the renderer will produce rendered fragment data for sampling points of two or more sets of the plural sets of one or more sampling points, add a first entry to a first queue of the two or more queues that correspond to the fine pixels covered by the block of one or more coarse pixels corresponding to the two or more sets; and retire one or more of the other queue or queues of the two or more queues.

12. The graphics processor of claim 11, wherein the fragment dependency manager is configured to:
for a subsequent graphics fragment or group of graphics fragments that when processed by the renderer will produce rendered fragment data for one or more sampling points of the two or more sets, add an entry to the first queue.

13. The graphics processor of claim 10, wherein:
the fragment dependency manager is configured to:
determine when a queue entry is to be added to a set of queues that corresponds to a different number of sets of one or more sampling points than the queue entry that was previously added to the set of queues; and
when it is determined that a queue entry is to be added to the set of queues that corresponds to a different number of sets of one or more sampling points than the queue entry that was previously added to the set of queues: change a counter value, and associate the counter value with the queue entry; and
the graphics processing is configured such that the renderer processes graphics fragments depending on the counter value.

14. The graphics processor of claim 13, wherein the fragment dependency manager is configured to change the counter value when a queue entry is to be added to the set of queues that is indicative of a fragment or group of fragments that has a different shading rate to the previous fragment or group of fragments for which an entry was added to the set of queues.

15. The graphics processor of claim 10, wherein the plural queues comprise a linked list data structure, and each queue comprises a respective linked list of the linked list data structure.

16. The graphics processor of claim 10, wherein:
the fragment dependency manager is configured to: for a graphics fragment or group of graphics fragments that corresponds to a block of one or more coarse pixels and that when processed by the renderer will produce rendered fragment data for sampling points of two or more sets of the plural sets of one or more sampling points, add a first entry to each of two or more of the two or more queues that correspond to the fine pixels covered by the block of one or more coarse pixels corresponding to the two or more sets; and
the graphics processing is configured such that the renderer can perform at least some processing for a graphics fragment or group of graphics fragments when all the entries in respect of that graphics fragment or group of graphics fragments are the oldest in their respective queues.

17. The graphics processor of claim 16, wherein the fragment dependency manager is configured to: add a first entry to each of the two or more queues that correspond to sampling points covered by the graphics fragment or group of graphics fragments.

18. The graphics processor of claim 16, wherein the plural queues comprise an array data structure, and each queue comprises a respective array of the array data structure.

19. A non-transitory computer readable storage medium storing computer software code which when executing on a processor performs a method of operating a graphics processor that comprises:
a rasteriser configured to rasterise input primitives to generate graphics fragments to be processed, each graphics fragment having one or more sampling points of an array of sampling points associated with it;
a renderer configured to process fragments generated by the rasteriser to generate rendered fragment data; and
a fragment dependency manager operable to maintain plural queues, wherein each queue corresponds to a respective block of one or more fine pixels corresponding to a respective set of plural sets of one or more sampling points that the array is divided into, and wherein each queue entry is indicative of one or more fragments that when processed by the renderer will produce rendered fragment data for one or more of the sampling points of the set of one or more sampling points to which the queue corresponds;
the method comprising:
the rasteriser generating graphics fragments; and
for each of one or more graphics fragments, the fragment dependency manager adding an entry indicative of the graphics fragment or a group of graphics fragments to at least one queue;
wherein for a graphics fragment or group of graphics fragments that corresponds to a block of one or more coarse pixels and that when processed by the renderer will produce rendered fragment data for sampling points of two or more sets of the plural sets of one or more sampling points, the method comprises:
the fragment dependency manager adding one or more first entries indicative of that graphics fragment or group of graphics fragments to at least one of the queues that correspond to the fine pixels covered by the block of one or more coarse pixels corresponding to the two or more sets; and
the fragment dependency manager, for a subsequent graphics fragment or group of graphics fragments that when processed by the renderer will produce rendered fragment data for one or more sampling points of the two or more sets, preventing at least some processing of the subsequent graphics fragment or group of graphics fragments by the renderer until the one or more first entries have been removed from the at least one queue.

* * * * *